(12) United States Patent
Kovnat et al.

(10) Patent No.: US 10,835,977 B1
(45) Date of Patent: Nov. 17, 2020

(54) APPARATUS, METHOD AND SYSTEM FOR MANUFACTURED STRUCTURES

(71) Applicant: Piasecki Aircraft Corporation, Essington, PA (US)

(72) Inventors: Seth Kovnat, Hermosa Beach, CA (US); Michael Chouinard, Swarthmore, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 189 days.

(21) Appl. No.: 15/803,770

(22) Filed: Nov. 4, 2017

Related U.S. Application Data

(60) Provisional application No. 62/417,428, filed on Nov. 4, 2016.

(51) Int. Cl.

| | |
|---|---|
| *B23K 1/00* | (2006.01) |
| *B23K 35/30* | (2006.01) |
| *B64C 1/18* | (2006.01) |
| *B23K 1/19* | (2006.01) |
| *B23K 35/36* | (2006.01) |
| *B23K 101/02* | (2006.01) |
| *B23K 103/04* | (2006.01) |

(52) U.S. Cl.
CPC .............. *B23K 1/0014* (2013.01); *B23K 1/19* (2013.01); *B23K 35/3033* (2013.01); *B23K 35/3606* (2013.01); *B23K 2101/02* (2018.08); *B23K 2103/05* (2018.08); *B64C 1/18* (2013.01)

(58) Field of Classification Search
None
See application file for complete search history.

(56) References Cited

U.S. PATENT DOCUMENTS

| | | | | | |
|---|---|---|---|---|---|
| 2,960,197 | A | * | 11/1960 | Langhans | B21D 47/00 428/116 |
| 3,030,703 | A | * | 4/1962 | Wirsing, Jr. | B23K 1/0014 228/181 |
| 3,110,961 | A | | 11/1963 | Melill | |
| 3,389,451 | A | * | 6/1968 | Speca | B21D 39/038 29/897.15 |
| 4,304,821 | A | * | 12/1981 | Hayase | B21D 26/055 156/79 |
| 4,689,870 | A | * | 9/1987 | Mieyal | E04C 2/36 29/469.5 |

(Continued)

OTHER PUBLICATIONS

McCowan, J.W. et al, Manufacturing Methods and Design Procedures of brazed refractory material metal honeycomb sandwich panels, Nov. 1963, DTIC online.

(Continued)

*Primary Examiner* — Devang R Patel
(74) *Attorney, Agent, or Firm* — Robert J. Yarbrough of Lipton, Weinberger & Husick

(57) ABSTRACT

A metallic structure defines ribs and a skin supported by the ribs. The ribs may be defined by metal strips and the skin may be attached to the ribs. Alternatively, the skin may be defined by a plurality of tiles and the ribs may be defined by flanges of each of the plurality of tiles that cooperate to define the ribs. Tiles may be attached to separate rib lattice. Structurally weak locations at nodes where ribs intersect may be reinforced. The components may be brazed together and the stiffness of adjacent locations in the structure adjusted in the brazing operation to reduce the difference in stiffness and to reduce resulting stress risers. The metallic structure may be armored using metal foam to absorb the energy of a projectile.

11 Claims, 26 Drawing Sheets

(56) References Cited

U.S. PATENT DOCUMENTS

| | | | |
|---|---|---|---|
| 4,801,070 A | 1/1989 | Hom | |
| 4,925,740 A | 5/1990 | Norris | |
| 6,599,645 B2* | 7/2003 | Wittebrood | B23K 35/0238 |
| | | | 228/181 |
| 7,243,879 B2* | 7/2007 | Fanucci | B64C 5/12 |
| | | | 244/123.1 |
| 7,281,809 B2 | 10/2007 | Warren | |
| 7,661,242 B2 | 2/2010 | Doersing | |
| 7,752,955 B2* | 7/2010 | Engelbart | F41H 5/0428 |
| | | | 89/36.02 |
| 8,176,635 B2* | 5/2012 | Queheillalt | B21C 23/14 |
| | | | 29/897 |
| 9,074,927 B2* | 7/2015 | Singh | G01H 13/00 |
| 9,266,304 B2* | 2/2016 | Fink | B29C 70/68 |
| 9,658,033 B1* | 5/2017 | Perciballi | B21D 31/04 |
| 2009/0038744 A1* | 2/2009 | Lee | B29C 70/342 |
| | | | 156/183 |
| 2010/0163716 A1 | 7/2010 | Bastnagel | |

OTHER PUBLICATIONS

D. Sypeck and H Wadley, Cellular metal truss core sandwich structures, Advanced Engineering Materials 2002, vol. 4, No. 10 (2002).

Paul Slysh, Isogrid Structures, Technology and Applications, General Dynamics, SAWE CAS-2, Index category 2.

SBIR/STTR, Low Cost Composite Modified Isogrid (Grid-Lock) Construction of Aircraft (1997).

D. Paul, et al, Evolution of U.S. Military Aircraft Structures Technology, Journal of Aircraft vol. 39, No. 1, Jan.-Feb. 2002.

A. Nordt et al, Optical Bench Assembly for the Near Infrared Camera University of Arizona.

McDonnel Douglas Astronautics Company, Isogrid Design Handbook, Feb. 1973.

X. Huang and NL Richards, Activated Difussion Brazing Technology for Manufacture of Titanium Honeycomb Structures—A Statistical Study American Welding Society and the Welding Research Council, 2004.

Schwartz, Mel, Brazing, 2nd Ed., ASM International Chapter 4: Base Metals and Baes-Metal Family Groups (2003).

Isogrid Composites Canada, Inc, Isogrid CNRC-IRAP, a Success Story presented Dec. 6, 2011.

NASA Jet Propulsion Laboratory, Castable Amorphous Mirrors and Mirror Assemblies, Mar. 2015.

SBIR contract award 32648, A new modified isogrid construction method (1997).

* cited by examiner

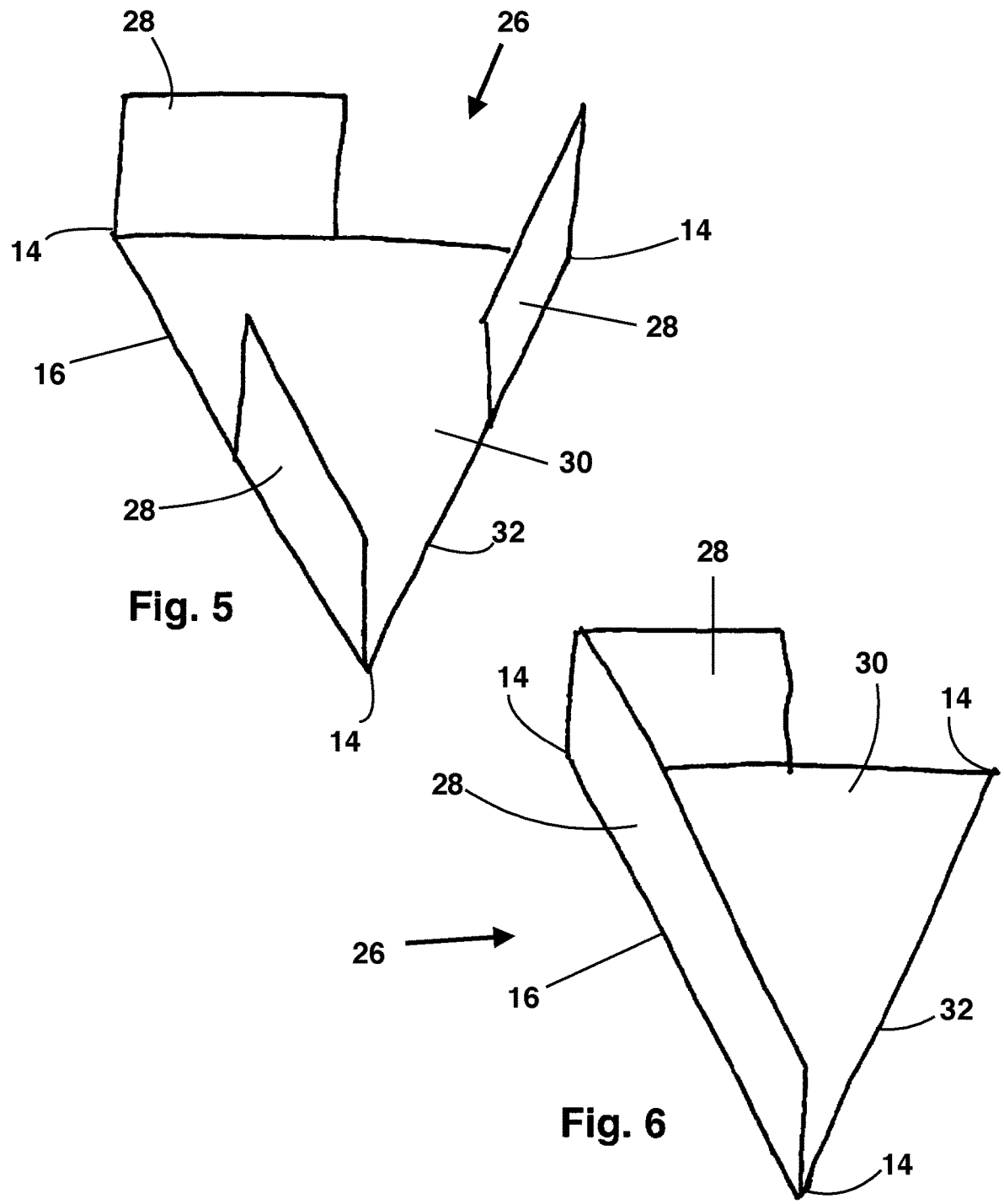

APPARATUS, METHOD AND SYSTEM FOR MANUFACTURED STRUCTURES

I. STATEMENT OF RELATED APPLICATIONS

This application is entitled to priority to U.S. Provisional Patent Application 62/417,428 filed Nov. 4, 2016, which is incorporated by reference as if set forth in full herein.

II. BACKGROUND OF THE INVENTION

A. Field of the Invention

The Invention relates to the construction of structures and has particular application to lightweight metallic structures such as aircraft or components of aircraft. The Invention includes apparatus, methods and systems for manufacturing the structures, for using the structures, for monitoring the completed structures, and for adjusting the mechanical properties of the materials from which the structures are composed during the manufacturing process.

One application of the Invention is in the construction of an aircraft floor that is stiff, strong, light, and more resistant to damage than prior art aircraft flooring. The Inventions is not limited to the construction of aircraft flooring and can be used to construct any structure where stiffness, strength and weight are design considerations.

B. Statement of the Related Art

Carbon fiber composite structures can be stiff, strong and light; however, carbon fiber composites are expensive to manufacture and difficult to repair. Carbon fiber composites are also subject to attack by solvents, are flammable, and are difficult to recycle or re-use.

In vacuum brazing, two (or more) components of the same or dissimilar metal are joined together by melting and flowing a filler metal into the joint between the components, where the filler metal has a lower melting point than the metal being joined. In vacuum brazing, the metal filler is heated slightly above its melting temperature (its 'liquidus') in a vacuum oven. The reduced air pressure in the vacuum oven prevents oxidation of the filler material or the metal being joined by oxygen in the air. The melted metal filler flows into the joint by capillary action. When the temperature of the components to be joined and the brazing filler drops below the liquidus temperature of the filler, or if the liquidus temperature of the filler rises above the temperature of the filler, then the brazing filler freezes to a solid, joining the components.

A variety of filler materials are available for different purposes and having different characteristics. For vacuum brazing of stainless steel components, a brazing filler containing an alloy of nickel, boron and phosphorous may be used. The nickel provides mechanical strength to the brazed joint. Boron increases the ability of the liquid-state filler to wet the stainless steel and hence increases the capillary action of the brazing filler and its ability to flow into the joint. The phosphorous lowers the melting temperature of the brazing filler and has a high vapor pressure. During vacuum brazing, the vacuum oven heats the stainless steel components and the nickel, boron and phosphorous brazing filler by radiant heating. The brazing filler melts and flows into the joint. The phosphorous evaporates due to its high vapor pressure in combination with the low air pressure in the vacuum oven. When the phosphorous has evaporated, the melting temperature of the remaining nickel/boron alloy increases to above its temperature. The nickel/boron alloy then freezes to a solid, joining the stainless steel components.

III. BRIEF SUMMARY OF THE INVENTION

The apparatus, methods and systems of the invention utilize ribs and skins composed of sheet metal. The ribs in combination may define any of a plurality of shapes; for example, triangles, tetragons, pentagons, hexagons, heptagons, octagons, any other polygons, curved or irregular shapes. Each shape has a depth defined by the width of the ribs. The ribs may define any other geometric or non-geometric shape. At least one skin is defined by at least one side of the shapes defined by the ribs to define the completed structure.

Where the shapes define equilateral triangles, the ribs and skins in combination may define an isogrid. The isogrid is isotropic, meaning that is has equal strength and stiffness in both the X and Y coordinate directions. By selecting shapes that are not equilateral triangles, the designer can create structures that are anisotropic, meaning that the strength and stiffness of the completed structure is different in different directions, and the strength and stiffness can be selected to be different in one location than in another location. An example application for an anisotropic structure using the invention is a curved propeller blade.

The embodiments of the invention are discussed below.

A. Metal Strips Define a Rib Lattice

In one embodiment, strips of thin-section stainless steel sheet are provided that are long compared to their width. In a vacuum-brazing oven, strips that are bent at intervals to define angles along the length of the strips are interspersed with strips that are not bent to define angles along the length of the strips. Each apex of each angle defined by each bent strip is placed in contact with a side of an un-bent strip to define one or more triangles.

For unbent strips that have a bent strip on either side, the apex of each bent strip is located at corresponding locations on opposite, corresponding sides of the unbent strip. The resulting structure will define six triangles, each of which has an apex that is immediately adjacent to an apex of each of the other of the six triangles. The location where the apexes of the six triangles meet is referred to herein as a 'node.'

A skin of thin-section stainless steel is placed in contact with one edge of the bent and unbent strips in the vacuum oven. The bent strips, unbent strips and skin are vacuum-brazed together to define a single completed structure. Where the triangles are equilateral, the brazed combination of the bent strips, unbent strips and skin define an isogrid structure.

Each of the strips may be equipped with a plurality of tabs at the edge of the strips. The skin may be equipped with slots corresponding to the tabs, so that the tabs may be inserted into the slots when the strips and skin are assembled. Twisting or bending the tabs when the tabs are inserted into the slots will maintain the strips and skin in engagement during the brazing process, avoiding the need for fixturing in the vacuum-brazing oven.

The bent strips or the unbent strips, or both, also may be provided with tabs and with corresponding slots so that the bent strips and unbent strips may be secured together during the vacuum brazing operation.

B. Individual Tiles with Flanges Joined to Define Ribs

In a second embodiment, the completed structure is composed of a plurality of individual tiles having flanges integral to the tiles. The flanges of the plurality of tiles are vacuum-brazed together to define the completed structure without a separate rib lattice. The individual tiles may be of any shape that will mate with adjoining tiles. The following discussion considers that the individual tiles are triangular for the sake of simplicity.

A triangular tile includes a triangular skin and three flanges, with each flange disposed at the perimeter of the triangle and defining a side of the triangle. Each of the three flanges has a width, which will define the depth of the rib of the completed structure. The skin may be composed of a sheet metal, such as a thin sheet stainless steel. The flanges also may be defined by the thin sheet stainless steel, and the thin sheet stainless steel may be bent to define both the skin and the flanges. The skin and flanges may be formed by any other suitable technique, such as direct metal printing or other additive process or by machining the tile from a solid block of metal.

A plurality of the tiles are placed in the vacuum-brazing oven with at least one apex of a tile immediately adjacent to at least one apex of another of the tiles and with the flanges of the adjoining triangles in intimate contact. The flanges of the adjoining triangles are brazed together to define the completed structure, which may be an isogrid structure. Two brazed-together flanges of adjoining tiles define the ribs at each location. The adjoining flanges for each tile may be reinforced at each apex, as by providing a fold of the flange at the apex for brazing to the adjoining flange of the same tile or of an adjacent tile.

Special-purpose tiles may be incorporated into the completed structure. For example, if the completed structure requires an attachment point to support or restrain a load, a tile may be constructed to define the attachment point, as by machining the tile with the attachment point from a solid block of metal. The special purpose tile is incorporated into the completed structure in the same manner as each of the other tiles.

C. Individual Tiles with Ribs Defined by a Single Thickness of Flange

The completed structure may be composed of individual tiles where all or a portion of a rib is defined locally by a single flange of only one tile. The result is that the amount of material, both brazing filler and flange, in the completed structure is substantially reduced.

In the example of triangular tiles, one half of the tiles may include two flanges that will define the ribs of the completed structure while the other half of the tiles define a single flange that will define the ribs of the completed structure. For the case of rectangular tiles, each tile may include two flanges that depend from two edges of the tile. The pair of flanges in combination with the flanges of other rectangular tiles will define the ribs of the completed structure. For the case of hexagonal tiles, each tile may include three flanges that will define the ribs of the completed structure.

Tiles that are symmetric and interchangeable may be most useful, particularly for the manufacture of flat or symmetrical completed structures. For example, each triangular tile may feature three flanges each of which extends from an apex of the triangular tile along an edge of the triangle by somewhat more than half of the length of the edge. Extending the flange more than half of the length provides that flanges of adjoining tiles will overlap when the tiles are assembled, allowing the flanges of adjoining tiles to be brazed together during the vacuum brazing step. A designer may select the strength of the rib by selecting the degree of overlap of the flanges defining the ribs. Other possible arrangements include that the flanges of each triangular tile features flanges that are disposed along one and one half of the three edges of the triangle. Any other arrangement of flanges that allows a single tile to by itself define at least a portion of a rib of the completed structure is contemplated by the invention.

As noted, individual tiles may have any number of sides, provides that the tiles will fit together to define a surface. The sides of the tiles are not necessarily regular, and will not be regular where the completed structure will feature compound curves.

D. Individual Tiles Supported by a Separate Rib Lattice

The third embodiment is that ribs may define a rib lattice that is separate from the individual tiles and that is joined to the individual tiles in the vacuum brazing step. For example, elongated strips of a metal, such as stainless steel sheet, may define the ribs. The width and thickness of each strip is small compared to its length. Each strip has a top edge and a bottom edge. Three configurations of strips define the ribs of a completed structure.

A first configuration strip features a notch defined by the top edge of the strip at the location of each node. A second configuration strip features a notch defined by the bottom edge of the strip at the location of each node. A third configuration strip have a 'dog-bone' shape having notches at both the top edge and bottom edge at the location of each node. The notches of the first, second and third configuration strips mesh, so that all three strips can intersect at the same node without interference. A plurality of first, second and third configuration strips define the rib lattice and intersect at each node of the rib lattice.

Individual tiles occupy the spaces between the ribs defined by the rib lattice and define the surface of the completed structure. The individual tiles may be constructed similarly to the individual tiles discussed above, except that the flanges depending from each edge of each tile define brazing flanges and do not define the depth of the ribs. The brazing flanges of each tile are deep enough to provide an adequate surface to create a brazed connection to the ribs that is of adequate strength for the application.

The first, second and third configuration strips and the tiles are constructed so that the strips and tiles are in a close relation on a fixture on the interior of the vacuum oven. The close relation provides that the brazed connection between the strips and the flanges of the tiles will be strong and without gaps or other defects.

Any number of strips may be used to construct the rib lattice, depending upon the shape of the tiles and the shape of the completed structure. For example, for four-sided tiles, strips of only the first and second configurations are required, because the apexes of only four tiles will meet at each node.

The rib lattice can be configured so that some portions of the rib lattice are stronger than other portions; for example, portions that are expected to bear a concentrated load may be configured to be deeper or the metal may be thicker than portions that are not expected to bear a concentrated load.

The rib lattice may be constructed by any other suitable technique; for example, by metal printing or other additive process or by machining the rib lattice from a solid block of metal. Whenever this document describes use or application of a rib lattice composed of metal strips, the use or application described applies equally to a rib lattice manufactured by metal printing or other additive process or by machining the rib lattice from a solid block of metal.

E. Individual Tiles with Separate Rib Lattice and Corner Reinforcements

The notches in the strips defining the ribs of the preceding section create a discontinuity in each strip and hence a weakness in the rib lattice at each node. Each node may be reinforced by a corner reinforcement disposed on the interior angles defined by the intersecting strips. For a structure using triangular tiles, each node includes three strips that define six interior angles. Corner reinforcements may be disposed at any or all of the six interior angles. The corner reinforcement may take the form of a member having an angle equal to the interior angle to be reinforced, composed of metal, and having a length corresponding to the depth of the ribs at the node. When the structure is vacuum brazed together, the corner reinforcement spans the notches of adjoining strips, reinforcing the node.

A tile may include a relief at an apex. The relief at the apex allows the corner reinforcement to be placed at each apex of each tile when the strips and tiles are assembled in the vacuum oven for brazing. During the vacuum brazing process, the corner reinforcement is brazed to the intersecting strips at the node and also is brazed to the tile and its flanges at the node.

Individual tiles may be constructed separately from the rib lattice by vacuum brazing the skin of the tile to the corner reinforcements. One or more backings also may be vacuum brazed to the corner reinforcements. The backing is spaced apart from the skin and may be perforated to reduce the weight of the completed structure and to allow access to the interior volume of the tile.

After the individual tiles are constructed, the tiles are vacuum brazed to the strips defining the rib lattice to form the completed structure. When the individual tiles are joined to the rib lattice, the corner reinforcements and the flanges of the skin and backing are vacuum brazed to the ribs of the rib lattice. In the completed structure, the interior volume of each tile is defined by the skin on the top, and backing on the bottom, the corner reinforcements at the corners and the ribs on the sides. Constructing the individual tiles in advance and using the corner reinforcements to join the skin and backing avoids the use of complex fixtures to support the skin, backing and corner reinforcements during the step of brazing the tiles and ribs to define the completed structure.

F. Individual Tile with a Core

Each of the tiles may feature a core. As noted, each tile includes a skin and may include flanges depending from the skin. The skin of each tile has a top side corresponding to surface of the completed structure and a bottom side corresponding to the interior of the tile. The flanges depend from the skin in a direction away from the top side of the skin.

Each tile may feature a core disposed on the bottom side of the tile skin and covering all or a portion of the bottom side of the tile skin. The core may increase the stiffness and strength of the tile and may increase the impact resistance of the skin. The core may be composed of any suitable material, such as a cellular metal, porous metal, metallic foam or metal sponge, all of which are referred to herein generally as 'metal foam.' The core can be attached to the bottom side of the skin by brazing during the vacuum brazing step; alternatively, the core may be attached to the bottom side of the skin during the manufacture of the individual tile and prior to the vacuum brazing step of the completed structure. The core may be composed of the same metal as the metal sheet defining the skin and flanges, for example stainless steel, or may be composed of a different metal than the metal composing the skin or flanges, provided that the coefficient of thermal expansion of the core is adequately similar to that of the skin so that the process of heating and cooling the skin and core during vacuum brazing does not damage the skin or core or leave the brazed skin or core with excessive residual stresses.

G. Individual Tile with a Backing

The individual tile may include a backing. The backing is a metal sheet covering the side of the core distal to the skin bottom side. The backing may attach the flanges of the tile one to another. The backing may be composed of a metal sheet and may be composed of the same metal as the skin. The backing may be brazed to the core, to the flanges, or to the rib lattice during the vacuum brazing step when the completed structure is assembled. Alternatively, the backing may be attached to the core or to the flanges during construction of the individual tile. The backing may be continuous or may be perforated.

The backing serves to reinforce the composite tile composed of the skin, core and backing. The composite tile is stronger and stiffer than a tile that that does not include the core and backing or that includes the core without the backing.

A tile may dispense with the core and provide a skin, flanges and backing with no core. Where strips of metal define the ribs of the completed structure, the backing may be attached to the rib lattice bounding the tile in the completed structure.

H. Multiple Individual Cells May Define a Composite Tile.

A plurality of individual cells may be assembled into a sub-assembly to define a composite tile using any of the configurations described in this document. A plurality of composite tiles then may be assembled into the completed structure.

For example, six individual cells that are triangular in shape and that have flanges on each side may be assembled into a larger hexagonal composite tile by vacuum brazing the flanges of adjacent cells one to another. The flanges of the cells define the ribs of the composite tile. The skins of the cells define the skin of the composite tile. The perimeter flanges of the composite tile then may be vacuum brazed to the perimeter flanges of other composite tiles to define the completed structure. The vacuum-brazed perimeter flanges of the composite tiles define the ribs of the completed structure.

The flanges of the individual cells that will define the perimeter flanges of the tile may be deeper than the other flanges of the individual cells, so that the ribs defined by the brazed perimeter flanges between the tiles are deeper than the ribs within the tiles.

As an alternative, intersecting metal strips may define the ribs between the composite tiles or between cells, or both, as described above. The perimeter flanges of the composite tiles are vacuum-brazed to the metal strips to define the completed structure. The composite tiles or the cells may feature a core or a core and a backing attached to the bottom side of the skins of the individual cells or to the bottom side of the skin of the cell.

I. Completed Structures Having Curved and Compound-Curved Shapes

The individual tiles or the individual tiles combined with a rib lattice may be used to construct a completed structure having flat, curved or compound curved surfaces. The configuration of the sides and the flanges of the combination of tiles determine the surface configuration of the completed structure.

For example, where the tiles are equilateral triangles all having the same side length, then the tiles are suitable for a completed structure that is flat or that defines a simple curve.

Conventional triangle mesh computer modeling illustrates straight-sided triangles used to define a shape having compound curves or curves having an increasing or decreasing radius of curvature. For a completed structure that incorporates compound curves and curves having a radius of curvature that is increasing or decreasing, the skins of the tiles will define irregular triangles and the length of the sides of the skins will not be the same, in the same way that triangles defining a complex surface using triangle mesh modeling may be irregular and may define sides of different lengths.

J. Different Sizes of Tiles for Different Curvatures

A relatively large tile may be suitable for a flat or gently curving surface, while a relatively small tile may be more suitable for a surface that defines a curve with a smaller radius of curvature, or where additional granularity is needed to define smaller features of the surface of the completed structure. The smaller the tiles, the more closely the tile will conform to a design curvature for the surface of the completed structure; however, the smaller the tiles the more braze joints per unit area of the surface and the more parts that must be assembled for the completed structure, with the resulting increased complexity and opportunity for error. A completed structure may incorporate tiles of various sizes and various side lengths, depending upon the local structural requirements of the completed structure and depending upon the local shape of the completed structure.

Providing tiles that are irregular or that are or different sizes may allow the completed structure to itself have an irregular shape; for example, for the construction of a storage tank to fit into a location that is irregularly shaped.

K. Sealed Tiles

A tile may be sealed during the brazing process so that the tile defines an interior volume that is fluid-tight. In this instance, the term 'fluid-tight' refers to an interior volume that is adequately sealed to prevent the movement between the inside and the outside of the interior volume of either liquid, gas, or both liquid and gas. The interior volume may be defined by the backing and the skin or between the backing, flanges and skin. Where a rib lattice supports an individual tile, the skin and backing, combined with the ribs surrounding the tile, may define the interior volume of the tile. Ports between adjacent tiles may allow fluid communication between the interior volumes of tiles. Ducts communicating with the interior of tiles may allow fluids to be added or removed from an interior volume of a tile.

A tile may have more than one backing. The more than one backing and the skin of the tile together define more than one interior volume of the tile, any or all of which may be sealed to be fluid-tight. The more than one interior volume may provide for segregated storage of fluids within the more than one interior volume.

Sealing the tile during vacuum brazing provides that the air pressure within the tile will be very low, which may allow the tile to be incorporated into the structure of a spacecraft without the requirement for venting the interior volume of the tile to either the interior or exterior of the spacecraft. Where the spacecraft is pressurized; for example, a manned spacecraft, the sealed, evacuated tile provides redundant protection from escape of air from the interior of the spacecraft and provides a monitoring location to detect whether air is leaking into the tile. Where the tile features more than one backing and more than one sealed interior volume, the tile provides multiply redundant protection from the escape of air from the interior of the spacecraft.

L. Fluid Storage

Providing a tile that has a sealed interior volume allows the interior volume to store a liquid or a gas, for example, where the completed structure is the airframe of an aircraft, the interior volumes of the tiles incorporated into that structure may store liquid fuel or compressed gas for the aircraft. Where the interior volumes of a plurality of tiles communicate one with another, the plurality of tiles may store more of the fluid than the interior volume of a single tile.

To move fluid into or out of the interior volume of a tile, fluid communication hardware may be built into the tiles and into the completed structure. For example, adjacent tiles and a rib lattice disposed between the adjacent tiles may define a port communicating between the interior volumes of the adjacent tiles. The port or the tiles may accommodate valves, fittings, pumps, electrical connectors, D-rings, and any other hardware and fittings required to move the fluid into or out of the interior volume of the tile.

M. Inflatable Structure

Tiles having fluid-tight interior volumes may be used to construct a completed structure that utilizes fluid pressure within the fluid-tight interior volumes to reinforce the structure. For example, a cylindrical completed structure may feature tiles having fluid-tight interior volumes into which a compressible fluid is pumped, increasing the pressure in the interior volumes so that the pressure in the interior volumes is greater than the pressure of the medium surrounding the completed structure. The resulting hoop stresses in the completed structure tend to maintain the cylindrical shape of the completed structure, allowing the completed structure to be constructed of lighter materials than would otherwise be the case.

An example is a submersible vehicle. The net hoop forces generated by the inflated interior volumes of the tiles serve to counteract the force of water tending to crush the submersible vehicle, while allowing the air pressure on the interior of the submersible vehicle to remain at atmospheric pressure. The result is that the cylindrical body or the submersible vehicle is lighter and requires fewer materials than would otherwise be the case.

M. Quality Control During Manufacture and Monitoring of the Completed Structure

The vacuum-brazed completed structure will include multiple brazed connections. Monitoring the manufacturing process to verify that those connections are properly secured during manufacturing and do not deteriorate during operation can be performed as follows:

1. The completed structure that is properly secured and that is not deteriorated will have a high acoustical resonance frequency, which may be in the ultrasonic range. The health of the structure may be checked by exciting the structure in the ultrasonic range and monitoring resonances that occur substantially below the ultrasonic range. For example, if the completed structure is excited ultrasonically, as by a transducer or piezo exciter, and if the completed structure generates audible resonance, then at least one structural issue exists. An example of a structural issue is a failed or leaky braze connection.

2. The audible monitoring of the structure may be aided by adding a mechanical resonator to the tile, such as the interior of the tile, that will resonate audibly at a frequency associated with a structural issue. The mechanical resonator may be a tuning fork-like apparatus having at least one time having a resonance frequency in the audible range and configured to be excited by the frequency associated with the structural issue. Where more than one audible frequency is associated with structural issues of the tile, the tile may include more than one mechanical resonator. When the tile is excited ultrasonically, tiles that have structural issues will resonate at one or more frequencies in the audible range and that resonance will be mechanically enhanced by the one or more resonating tines.

3. A leak in a sealed interior volume may be monitored by providing a location on the visible surface of the tile that moves in response to pressure. For example, the skin or backing of a tile may define a Belleville spring that has two positions—a first position that the Belleville spring maintains when the interior volume of the tile is maintained at a low pressure, and a second position to which the spring moves when the pressure in the interior volume of the tile increases, as when air leaks into the interior volume. An example of a Belleville spring is a lid of a canning jar, which is depressed when the interior of the jar is sealed at low pressure, but pops up to a second position when the jar is opened and the air pressure inside the jar increases to atmospheric pressure.

An inspector inspects the tiles by visually observing the Belleville springs to determine whether any springs are in the popped-up position indicating a leak.

For tile interior volumes that are maintained as a higher pressure than the surrounding atmosphere, for example, for the storage of compressed gas, the Belleville springs may be oriented so that the springs pop inward when the pressure inside the interior volume drops, indicating a leak.

4. For tiles having interior volumes that are maintained at lower or higher pressures than the surrounding gas, the tiles may change shape due to the pressure, as by having a skin or backing that is slightly convex or concave, depending on whether the interior or the exterior of the tile is at the higher pressure. The surfaces of the skins or backing or both of a completed structure may be interrogated as by a scanning laser to determine whether each of the tiles has the expected change in shape. Any tile that does not exhibit the expected change in shape may have a leak.

5. The tiles or the completed structure may include an apparatus for directly measuring the pressure differential between the interior volume of the tile and the surrounding atmosphere, for example a pressure gauge. The integrity of each tile may then be verified by direct observation of the pressure gauge or by automated monitoring of the pressure gauge, as by a control system.

N. Gradient Metallurgy

Construction of the completed structure using tiles or tiles and ribs composed of a relatively thin sheet metal, such as sheet stainless steel, and utilizing vacuum brazing allows adjustment of the local metallurgical properties of the completed structure during the vacuum brazing process. As used in this document, the term 'local' means that a metallurgical property may be changed during the brazing process so that the property is different at one location within the completed structure than at another location within the completed structure.

An example of a metallurgical property of the stainless steel sheet that may be locally changed is stiffness. A local increase in the concentration of nickel in stainless steel will reduce the stiffness of the stainless steel at the location of the increased concentration. By locally controlling the amount of nickel in the stainless steel, a designer can adjust the local modulus of elasticity of the stainless steel sheet, and hence the local stiffness of the completed structure.

A second example of a metallurgical property that may be locally adjusted is conductivity, both thermal and electrical. A local increase in the concentration of copper in the stainless steel sheet will locally increase the thermal and electrical conductivity of the stainless steel to, for example, allow more efficient operation of a heat exchanger at the location of higher conductivity.

The following discussion addresses local change to the nickel concentration in stainless steel sheet to locally control stiffness, but the same principals apply to any relatively thin metal sheet being vacuum brazed and to any local adjustment of the concentration or concentration gradient of another metal or metals that will diffuse into the relatively thin metal sheet during the brazing process.

Stainless steel resists corrosion due to a passive layer of chromium oxide that forms on the surface of the stainless steel. The chromium oxide layer must be removed prior to vacuum brazing. In preparation for vacuum brazing, chemical baths may remove the chromium oxide layer and the stainless steel may be plated with a less-reactive metal, such as nickel, to prevent the chromium oxide layer from reforming. The nickel-plated stainless steel also may be coated with nickel-containing brazing fillers. When the vacuum-brazing oven heats the plated, coated, stainless steel, the nickel in the plating and the brazing filler diffuses into the sheet stainless steel. The diffusion of the nickel into the stainless steel creates a nickel diffusion gradient within the stainless steel. The stainless steel will have a higher concentration of nickel close the surface of the stainless steel that is in contact with the nickel plating or the nickel-containing brazing filler and a lower concentration of nickel in the stainless steel farther away from the surface.

For tiles and ribs composed of a relatively thin stainless steel sheet, the nickel may diffuse through the entire thickness of the sheet stainless steel from one side to the other. The higher the temperature in the brazing furnace and the longer the time allowed for diffusion, the more nickel will diffuse into the stainless steel and the more even the distribution of nickel through the sheet stainless steel will be.

The amount of nickel in contact with the stainless steel during the vacuum brazing process affects the amount of nickel that will diffuse into the stainless steel. The thicker the nickel plating and the thicker the coating of nickel brazing filler, the more nickel will diffuse into the stainless steel. A designer may select thicker nickel plating, or a thicker coating of nickel brazing filler, for a local area of the completed structure where the designer intends the completed structure to have a higher concentration of nickel in the stainless steel sheet, and hence a higher ductility and a lower stiffness or modulus of elasticity than at another location in the stainless steel sheet.

By adjusting the thickness of the nickel plating and the nickel-containing brazing filler at different locations on the stainless steel sheet and by adjusting the temperature, duration and temperature profile of the vacuum brazing operation, the designer can closely control the concentration of nickel and the concentration gradient of the nickel in the stainless steel at any location within the completed structure. The designer can thereby closely control the stiffness and the stiffness gradient (the local change in stiffness from one location to another) of the completed structure at each location within the completed structure.

An example of the application of this invention is a node of the completed structure. The nodes are the locations in the completed structure where the ribs converge. For the completed structure having vacuum-brazed individual tiles, ribs and corner reinforcements, and in the absence of the stiffness adjustment of this invention, each node will be stiffer than the areas of the completed structure surrounding the node. Applying a load to the completed structure will cause stress risers proximal to the node due to the disparity in stiffness between the node and the areas surrounding the node. Repeated or excessive loading may lead to crack formation due to the stress risers and failure of the completed structure. To avoid this result in the absence of the stiffness adjustment of the invention, the designer is tempted to over-design the completed structure, using more and stronger materials than are necessary, with the resulting weight and cost penalties.

This effect may be avoided by matching the strain characteristics; that is, the stiffness, of the node with that of the areas surrounding the node to reduce the creation of stress risers when a load is applied to the completed structure. The designer may match the stiffness of the node with that of areas surrounding the node by selecting: the thickness of the nickel plating and thickness of the brazing filler at the node, the thickness of the nickel plating and brazing filler on the areas between the nodes, the temperature profile of the vacuum-brazing oven, and the duration of the vacuum brazing operation. As used herein, the 'temperature profile' is the temperature of the material being brazed within the brazing furnace and the change in that temperature over time during the duration of the brazing operation. For a vacuum-brazing oven configured for differential heating, the temperature profile for one location on the completed structure, for example, the nodes, may be selected to be different from the temperature profile at another location on the completed structure. The designer will select the above values so that more nickel diffuses into the stainless steel sheet at the nodes and less nickel diffuses into the stainless steel at the location between the nodes so that the stiffness of the completed structure at the nodes matches the stiffness of the areas between the nodes as closely as possible and to avoid abrupt changes in stiffness between locations.

The adjustment of the local metallurgical characteristics of the brazed metal sheet occurs during the vacuum brazing operation. The invention applies to any components of any manufactured object composed of metal sheet that may be vacuum brazed. Any of the alloying materials known in the art that may be coated or plated onto the metal sheet and that will diffuse into the metal sheet at vacuum brazing temperatures may be used to locally adjust the metallurgical characteristics of the metal sheet. Two or more alloying materials may be used to adjust the metallurgical characteristics of the metal sheet during the same brazing operation.

O. Projectile Resistance

The completed structure may incorporate metal foam to provide resistance to projectiles, such as when the completed structure is used as an airframe or a floor of a military aircraft. To provide projectile resistance, a layer of metal foam is disposed on the side of the completed structure that faces the threat. The metal foam will extend beyond the ribs of the completed structure to protect the ribs from, say, a strike by a bullet or by shrapnel. The metal foam may be generated during the vacuum brazing process by any of the techniques known in the art for generating metal foams at the temperatures at which the tiles or ribs are vacuum brazed. Alternatively, the metal foam may manufactured separate from the vacuum brazing step and may be attached to the completed structure by the vacuum brazing process.

A high-strength material having little or no elongation in tension may be located at the surface of the metal foam and between the metal foam and the source of the projectile. The high-strength material having little or no deformation in tension may be any such material known in the armor art and may include glass fibers, carbon fibers, aramid fibers, and ultra-high-molecular-weight polyethylene. One brand name of such a material is Kevlar®. The high-strength material and the metal foam in combination define an armor that provides greater resistance to penetration by projectiles than either the high-strength material or the meal foam alone. When a projectile strikes the high-strength material reinforced by metal foam, the projectile does not penetrate the high-strength material and instead the projectile pulls the high-strength material into the metal foam, compressing the metal foam. Because the high-strength material is attached to the outer surface of the metal foam, the tension load on the high-strength material generated by the kinetic energy of the projectile is spread over an area much larger than the size of the projectile. In addition, the little or no elongation of the high-strength material results in the compression of the metal foam from the movement of the high-strength material over an area much larger than the size of the projectile, dissipating the energy of the projectile by the compression of a relatively large volume of metal foam. The result is that the projectile does not penetrate the high-strength material, does not penetrate the metal foam, and does not reach the tiles or ribs of the completed structure.

Unlike sacrificial ceramic armor panels, armor that is a combination of the high-strength material and the metal foam does not suffer catastrophic failure as a result of a projectile strike and is capable of stopping multiple projectiles without repair. The high strength material/metal foam armor that is damaged may be repaired by cutting out and replacing the damaged portion, as by adhesive bonding a patch in place of the damaged portion.

The ability of the metal foam and the high-strength material to absorb energy from projectiles may be enhanced by providing multiple layers of the metal foam having different characteristics. For example, reticulated (open cell) metal foam allows movement of fluid (such as air) through the foam, while closed-cell foam allows little movement of fluid through the foam. A metal foil will block the passage of fluid. Layers of reticulated foam may be alternated with layers of closed cell foam or with layers of closed cell metal foam and metal foil. When a projectile strikes the high-strength material and the high strength material compresses the underlying metal foam, the high-strength material will compress the air in the underlying foam and generate a shock wave emanating from the location of the impact. When the shock wave reaches a layer of reticulated foam or reticulated foam backed by a metal foil, the pressure wave is vented sideways within the layer of reticulated foam and parallel to the surface of the metal foam or high-strength material. The energy of the pressure wave is dissipated as heat within the metal foam and never reaches the tiles or ribs of the completed structure.

The use of closed-cell metal foams allows the cells of the foam to act as air springs and to have some resilience to rebound from the deformation of the foam caused by a projectile strike. The compression and rebound of the closed-cell foam absorbs and then (relatively) slowly releases kinetic energy from the projectile strike, reducing the damage caused by the projectile.

P. Heat Shield Application

The completed structure of the invention is relatively light, stiff and strong. When composed of stainless steel sheet joined by brazing, the completed structure also is thermally stable. The completed structure therefore is suitable for use as a heat shield, either alone or in combination with materials resistant to very high temperatures, such as ceramics. One application for such a heat shield is a re-entry vehicle.

Q. Other Materials and Other Attachment Methods

While the structures described in this document may be composed of metal and feature brazed constructions as described above, the structures may be composed of any material suitable for a particular application. The joining technique for the structures of the invention also may be any technique known in the art that is compatible with the selected materials and that is suitable for the application.

For example, the skins, backing, flanges or core may be riveted, adhered, or fastened together to define tiles. The tiles, or tiles and rib lattice, may be riveted, adhered or fastened together to form panels. The panels, or panels and rib lattice, can be riveted, adhered or fastened together to form a completed structure. The skins, backing, flanges and rib lattice may be composed of one or more polymers or of one or more composite materials such as carbon fiber or glass-reinforced resin. Cores may be composed of honeycomb, foam, balsa or any other suitable material. The adhesive joining the components, or the components themselves, may be thermoplastic or thermosetting, so that heating of the assembled components either with or without an adhesive joins the components into the completed structure.

R. Tabs and Slots

As described above, tabs and slots may join ribs to skin and may allow self-fixturing for the brazing step and may be used to attach or self-fixture components for any of the embodiments.

The tabs may be configured to have wings on either side of the tab. The wings define flat springs. When the tab is inserted through a slot in a skin or other component and is twisted with respect to the skin or other component, the effective height of the tab with respect to the skin or other component is reduced, which lowers the wings and bring the wings into contact with the surface of the skin or other component on either side of the slot. The wings bear upon the skin or other component and elastically deform. The wings apply a force to the skin or other component that is determined by the spring rate of the flat springs defined by the wings and by the elastic deformation of the wings. The wings allow the pressure exerted by the tab on the skin or other component to be controlled and allows damage to the skin by the tab when the tab is twisted to be reduced or eliminated.

S. Sheet Skin Supported by a Rib Lattice and Individual Tiles

A structure defined by a rib lattice and individual tiles may support a sheet skin, particularly where a surface is desired that does not exhibit the seams between each tile. The structure may include a core disposed between the sheet skin and the combination of the rib lattice and the tiles.

III. BRIEF SUMMARY OF THE DRAWINGS

FIG. 5 is a perspective view of a first alternative individual tile where the flanges do not surround the tile.

FIG. 6 is a perspective view of a second alternative individual tile where the flanges do not surround the tile.

Figure 21:
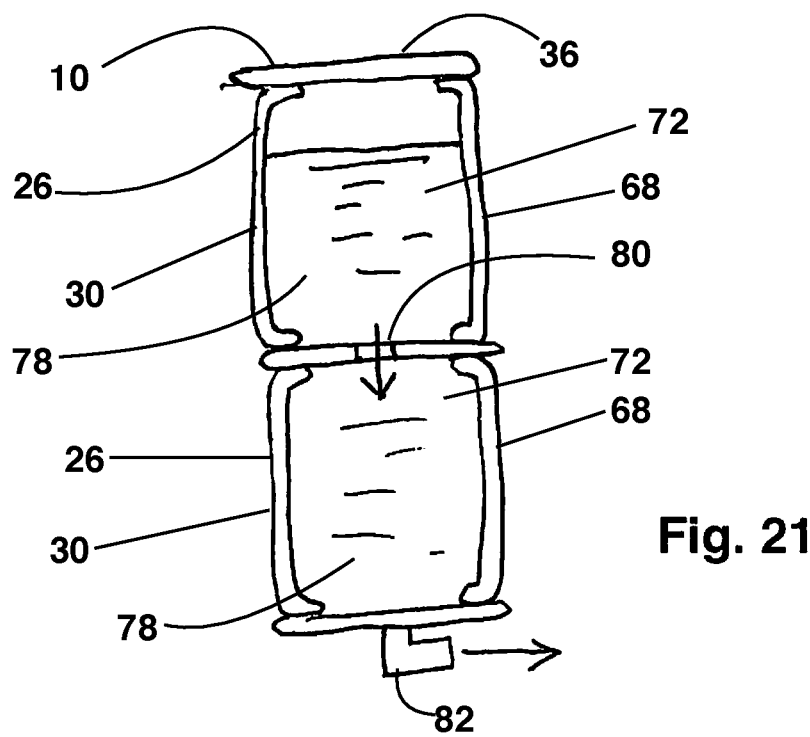

FIG. 21 comprises two sealed tiles joined by port and containing a fluid.

Figures 22, 23:
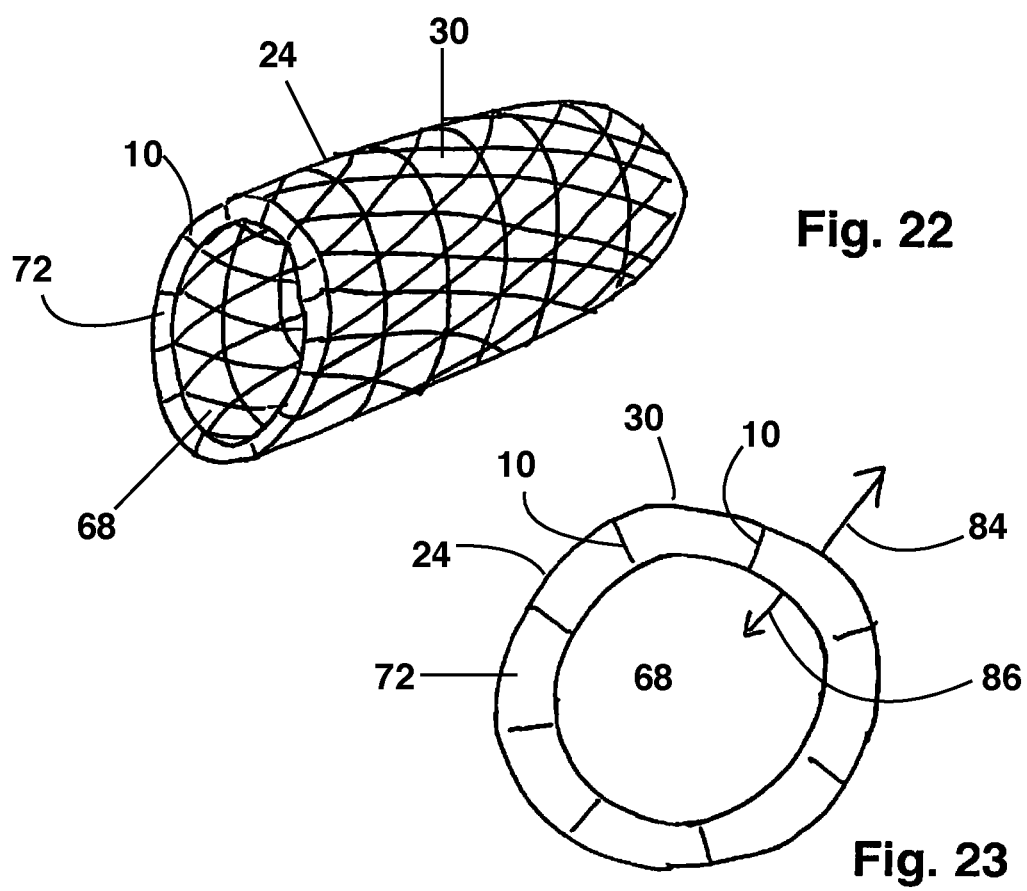

FIG. 22 is an inflated metal structure in which pressure within the interior volume of the tiles helps to support the structure.

FIG. 23 is a cross section of the inflated metal structure of FIG. 22.

Figure 24:
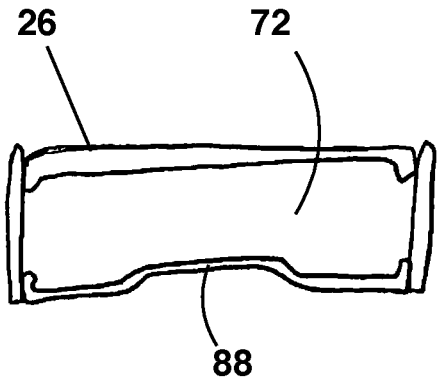

FIG. 24 is a cross section of a tile along section line A-A with a Belleville spring in a first position.

Figure 25:
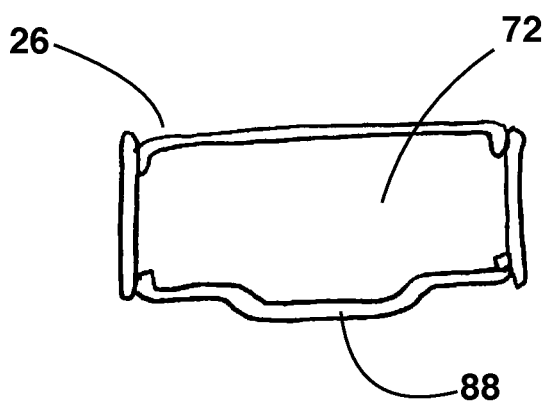

FIG. 25 is the cross section of FIG. 24 with the Belleville spring in the second position.

Figure 26:
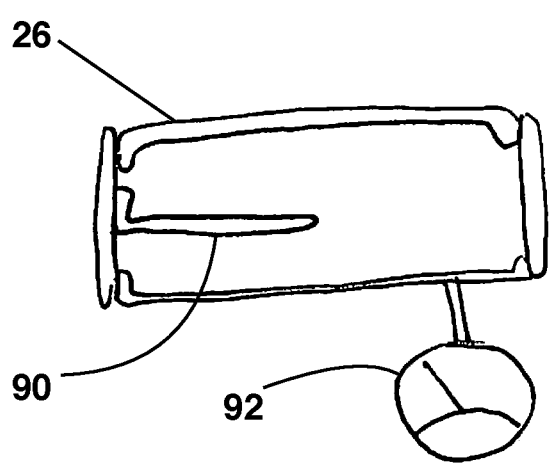

FIG. 26 is a sealed tile with a resonator and pressure gauge.

Figure 27:
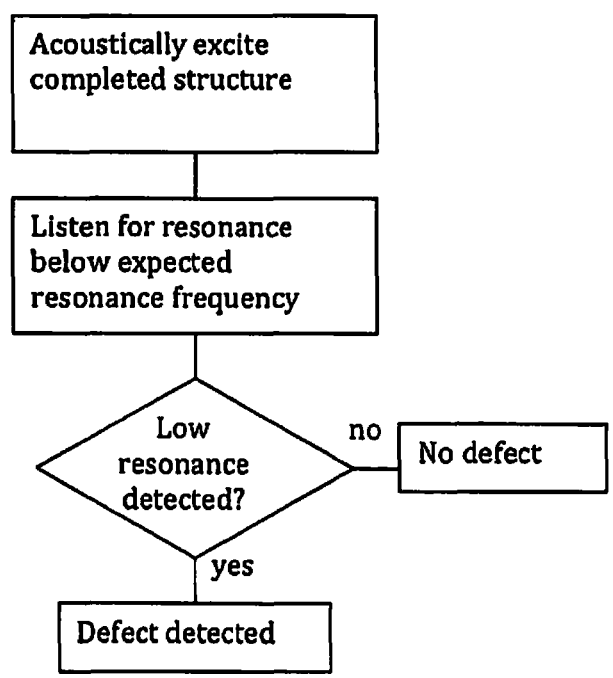

FIG. 27 is a method for acoustically monitoring a completed structure.

Figure 28:
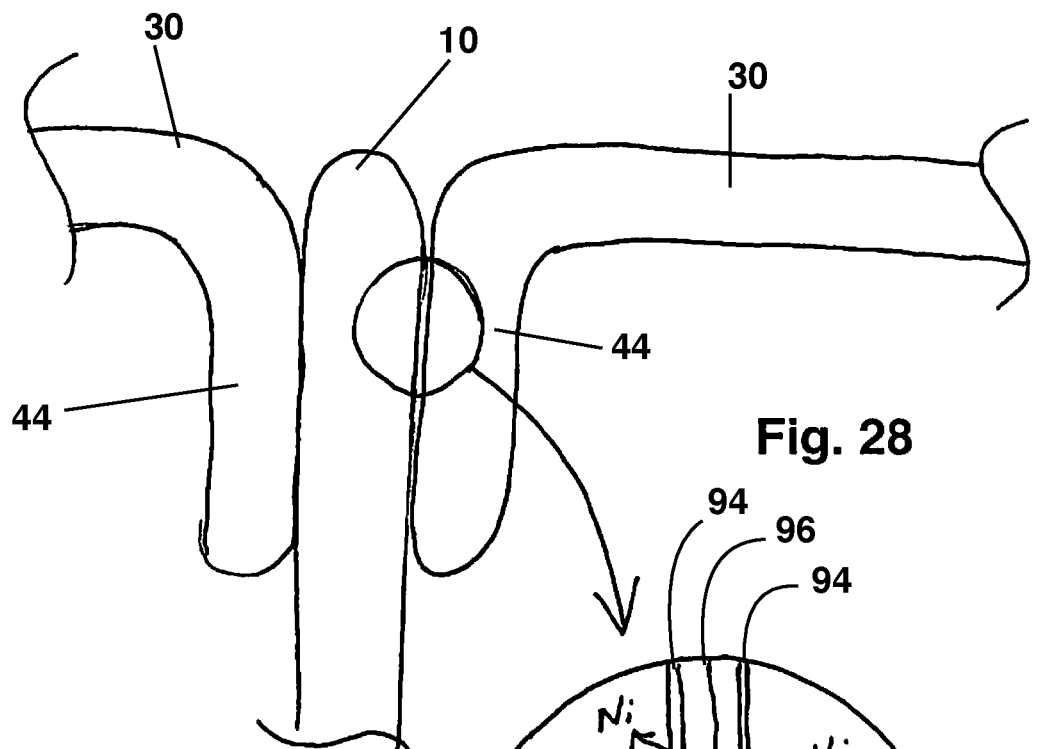

FIG. 28 is a detail of a joint during the brazing operation.

Figure 29:
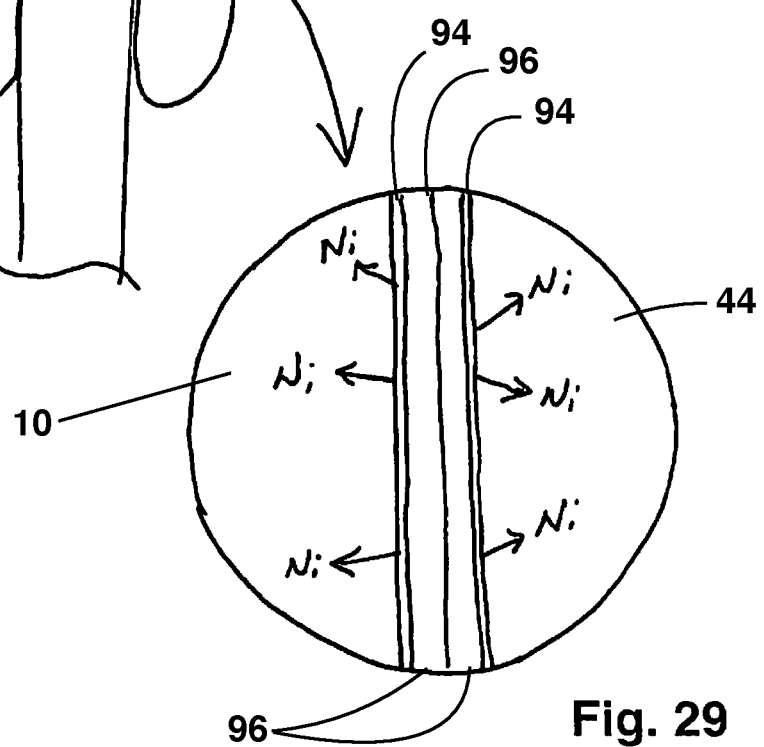

FIG. 29 is a magnified view of a portion of FIG. 28 showing diffusion of nickel.

Figure 30:
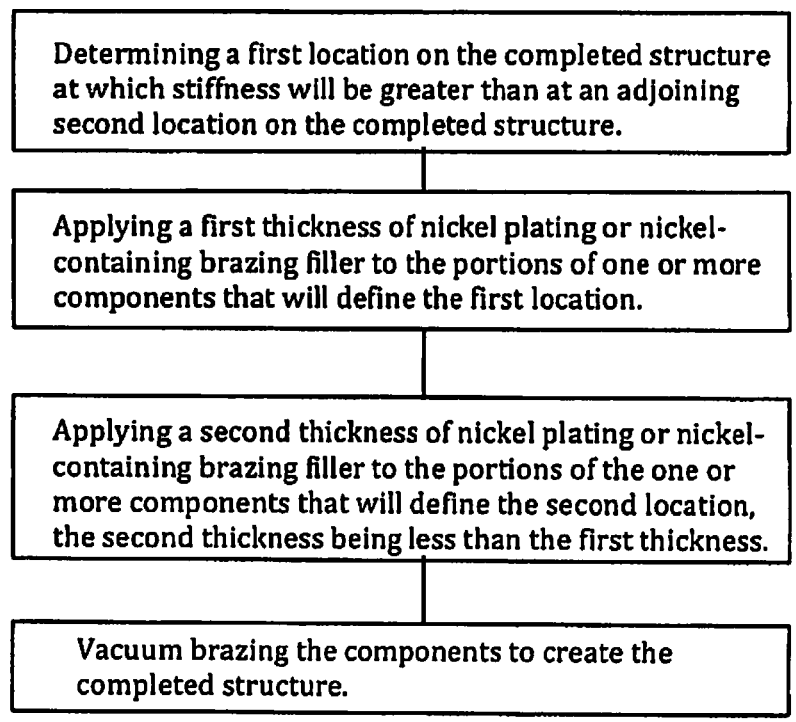

FIG. 30 is a method of reducing stress risers in the completed structure.

Figure 31:
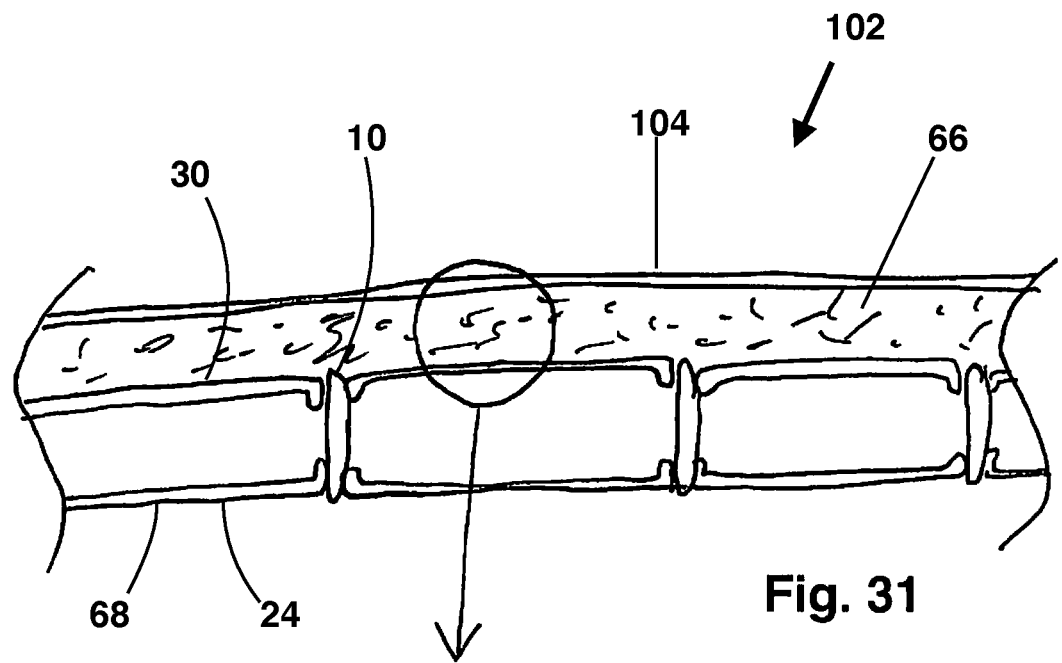

FIG. 31 is a cross section of a completed structure that is armored.

Figure 32:
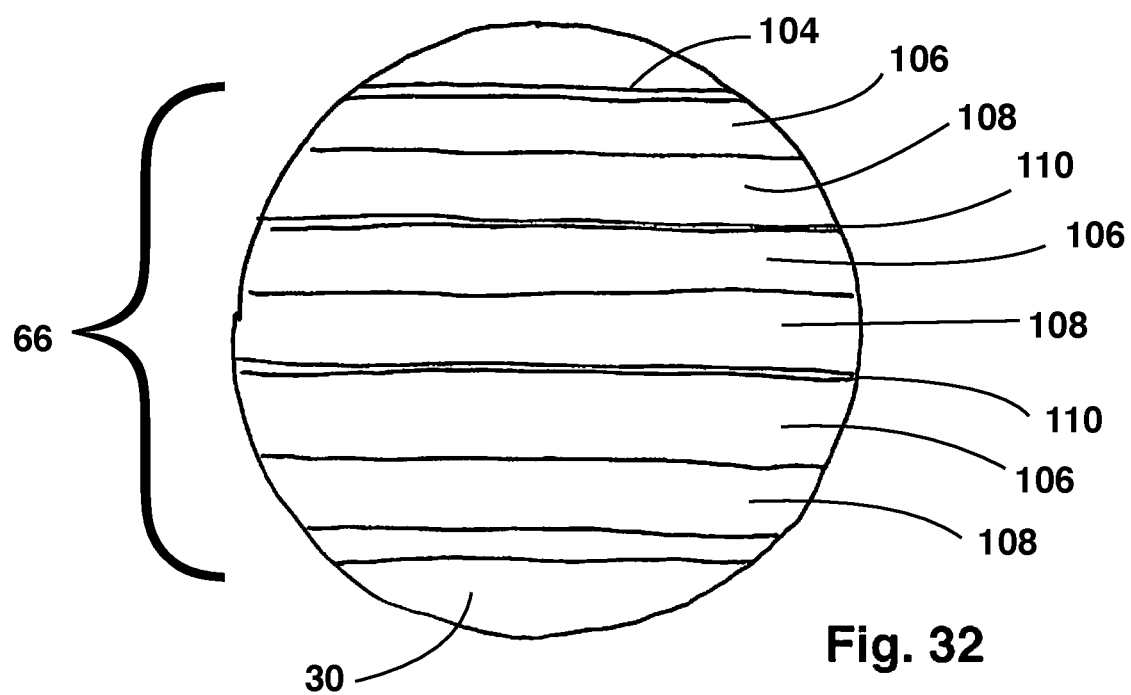

FIG. 32 is a detail cross section of the armor.

Figure 33:
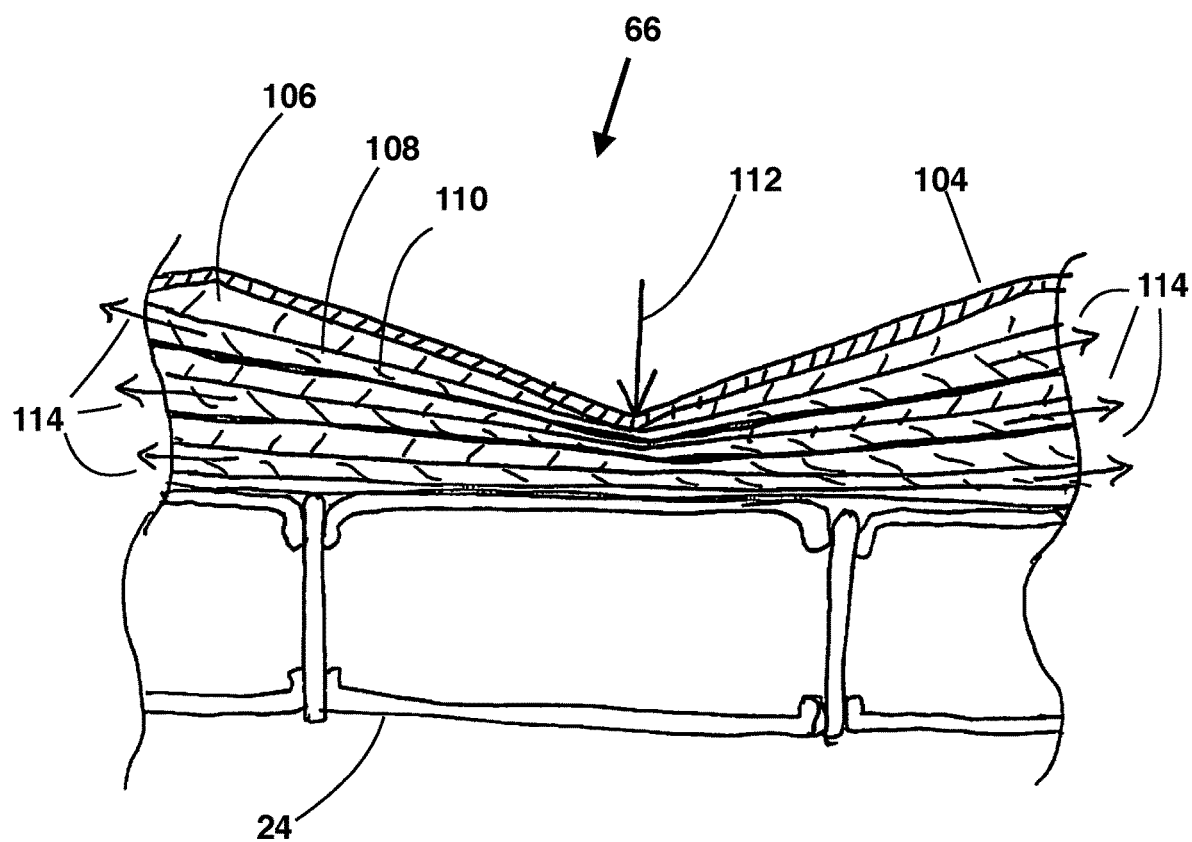

FIG. 33 is a detail cross section of the armor during an impact by a projectile.

Figure 34:
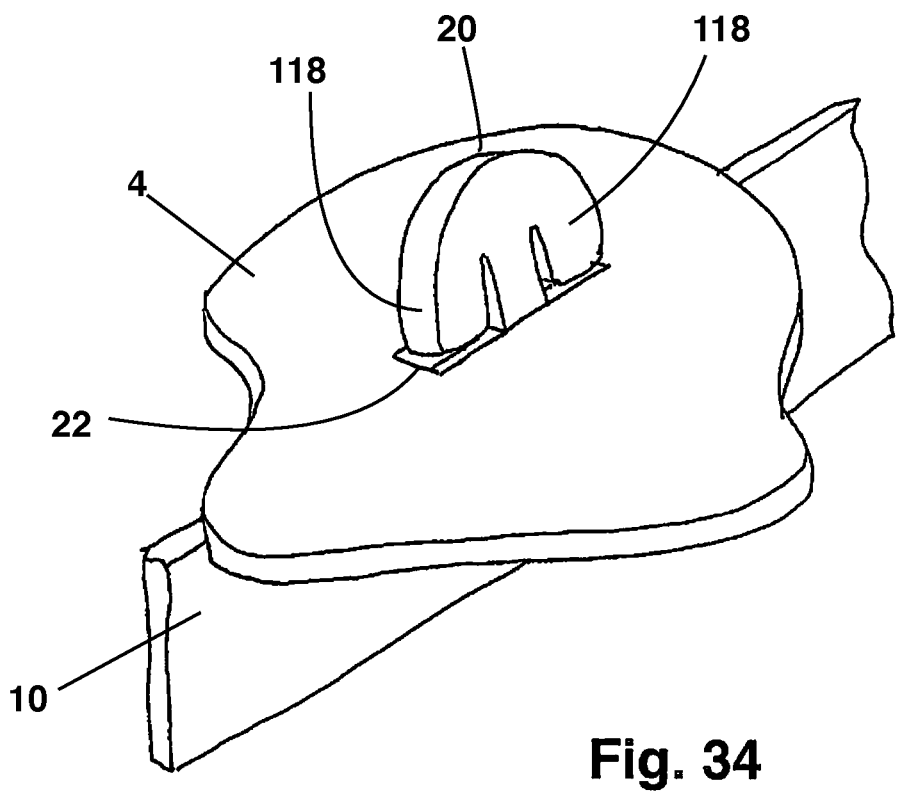

FIG. 34 is a detail of a tab and slot in a first position, the tab having wings.

Figure 35:
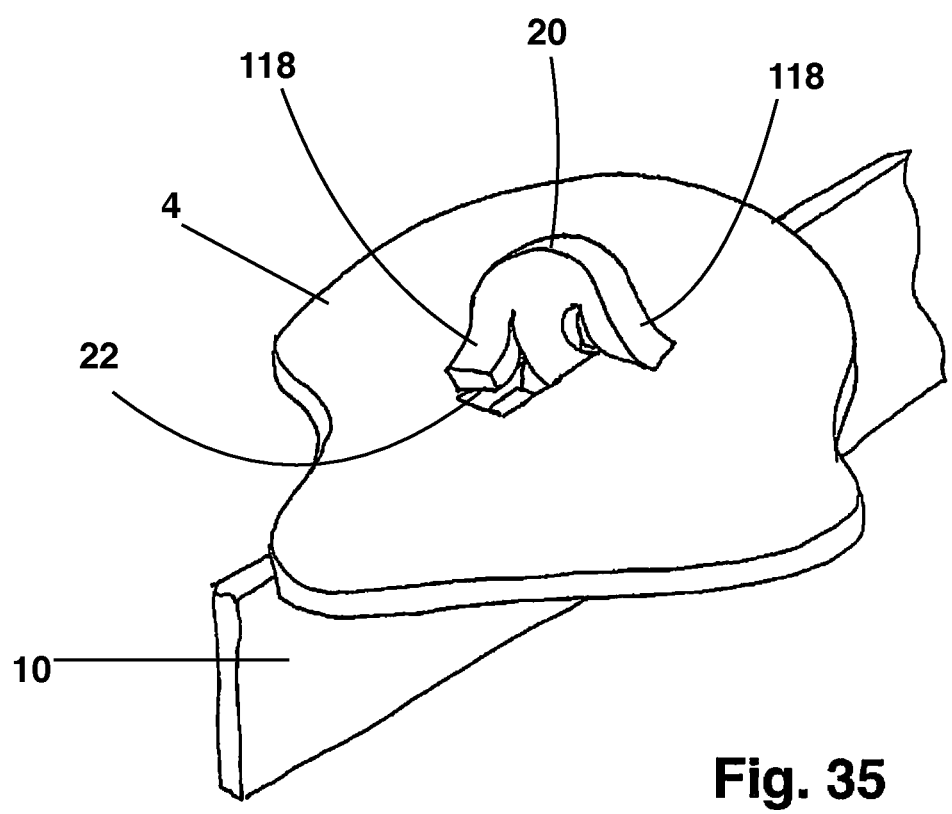

FIG. 35 is the detail of FIG. 34 with the tab in the twisted position.

Figure 36:
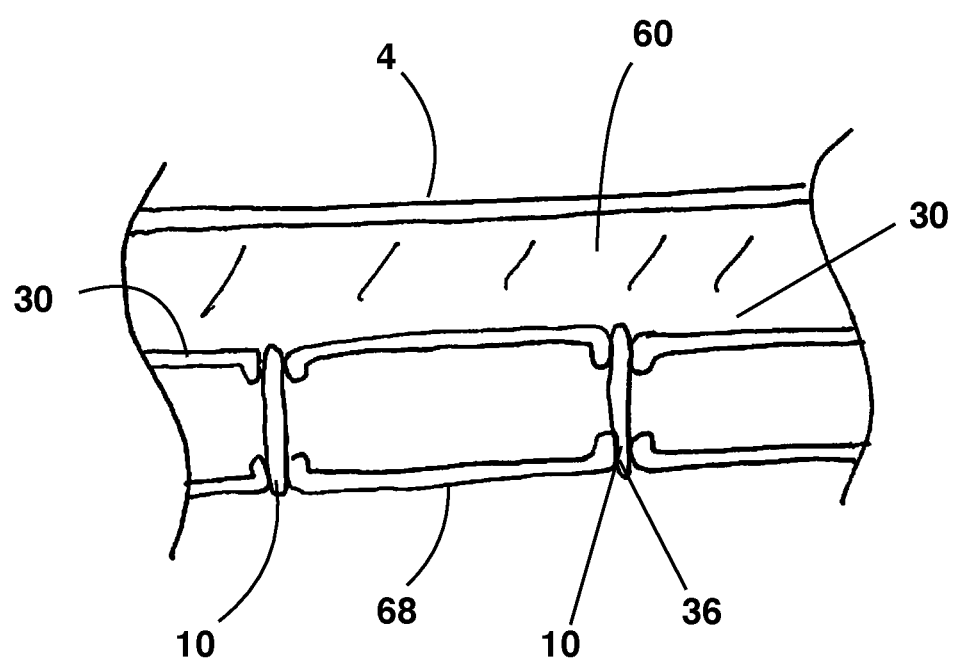

FIG. 36 is a detail cross section of a sheet skin and core supported by a combination of a rib lattice and individual tiles.

IV. DESCRIPTION OF AN EMBODIMENT

Figure 1:
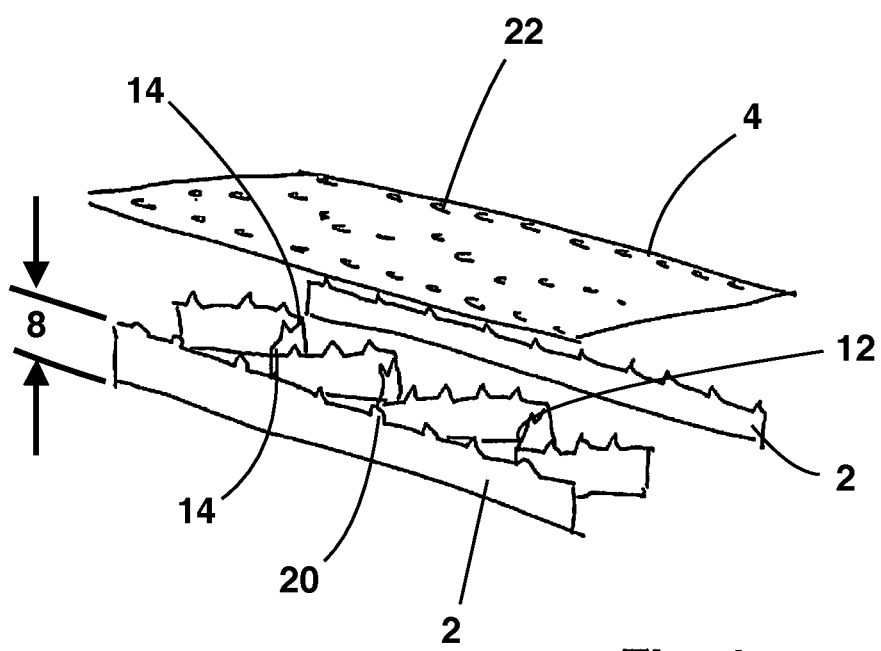
FIG. 1 is an exploded view of a triangular honeycomb structure.
Figure 2:
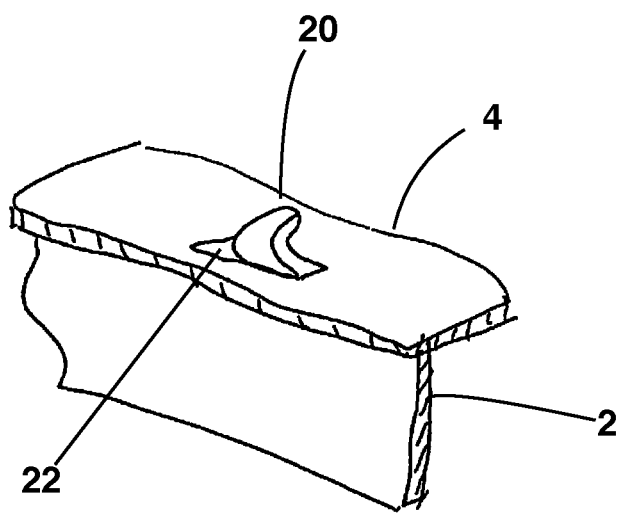
FIG. 2 is a cutaway detail view of the attachment of the triangular honeycomb structure.
Figure 3:
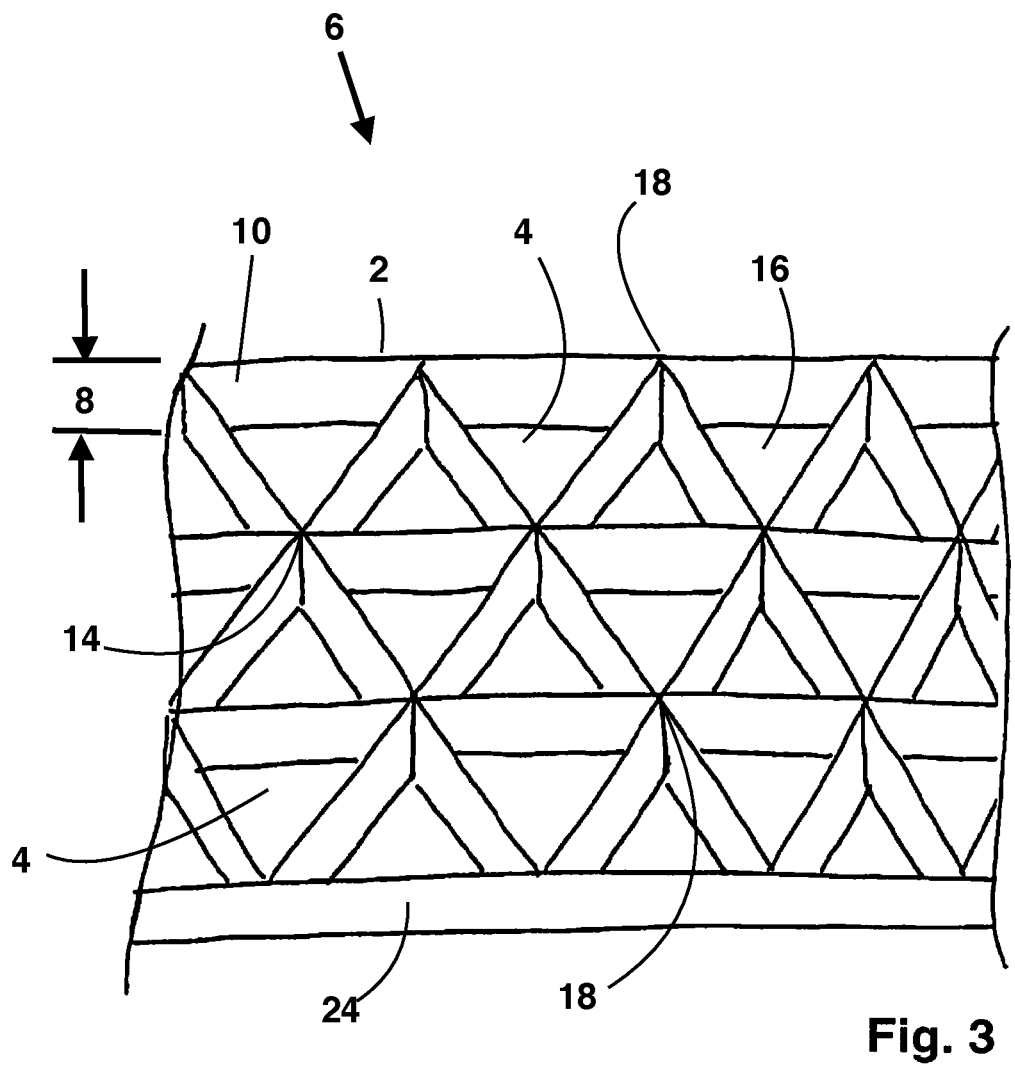
FIG. 3 is an isogrid structure incorporating triangular honeycomb.

FIGS. 1, 2 and 3 illustrate the first invention in which metallic strips 2 of thin-section stainless steel are vacuum-brazed to thin stainless steel skin 4 to define an isogrid structure 6. The strips 2 of thin-section stainless steel sheet are long compared to their width 8. The width 8 of each strip 2 defines the depth of a rib 10 of a completed structure 24. In a vacuum-brazing oven, strips 2 that are bent at intervals to define angles 12 along the length of the strips 2 are interspersed with strips 2 that are not bent to define angles 12 along the length of the strips 2. Each apex 14 of each angle 12 defined by each bent strip 2 is placed in contact with a side of an un-bent strip 2 to define one or more triangles 16. The bent strips 2, unbent strips 2 and skin are brazed together in a vacuum-brazing oven.

For unbent strips 2 that have a bent strip 2 on either side, the apex 14 of each bent strip 2 is located at corresponding locations on opposite, corresponding sides of the unbent strip 2. As shown by FIG. 3, the resulting completed structure 24 may define six triangles 16, each of which has an apex 14 that is immediately adjacent to an apex 14 of each of the other of the six triangles 16. The location where the apexes 14 of the triangles 16 meet is referred to herein as a 'node' 18.

The skin 4 of thin-section stainless steel is placed in contact with one edge of the bent and unbent strips 2 in the vacuum oven. The bent strips 2, unbent strips land skin 4 are vacuum-brazed together to define a single completed structure 24. Where the triangles 16 are equilateral, the brazed combination of the bent strips 2, unbent strips 2 and skin 4 define an isogrid structure 6.

Each of the strips 2 may be equipped with a plurality of tabs 20 at the edge of the strips 2. The skin 4 may be equipped with slots 22 corresponding to the tabs 20, so that the tabs 20 may be inserted into the slots 22 when the strips 2 and skin 4 are assembled. Twisting or bending the tabs 20 when the tabs 20 are inserted into the slots 22 will maintain the strips 2 and skin 4 in engagement during the brazing process, avoiding the need for fixturing in the vacuum-brazing oven.

The bent strips 2 or the unbent strips 2, or both, also may be provided with tabs 20 and with corresponding slots 22 so that the bent strips 2 and unbent strips 2 also may be secured together during the vacuum brazing operation.

FIGS. 4 through 7 illustrate another embodiment in which the completed structure 24 is composed of a plurality of individual tiles 26 having integral ribs 10. The individual tiles 26 are vacuum-brazed together to define the completed structure 24. The individual tiles 26 may be of any shape that will mate with adjoining individual tiles 26, including parallelograms, hexagons and irregular or curved shapes. Combinations of different shapes for the individual tiles 26 may be used for the completed structure 24. The following discussion considers that the individual tiles 26 are triangular for the sake of simplicity.

A triangular tile 26 includes a tile skin 30 and three flanges 28, with each flange 28 defining a side 32 of the triangle 16. For individual tiles 26 having more or curved sides 32, each side 32 will have a flange 28 that defines the side 32. Each of the flanges 28 has a width 8, which will define the depth of the rib 10 of the completed structure 24. The tile skin 30 may be composed of a sheet metal, such as a thin sheet stainless steel. The flanges 28 also may be defined by the thin sheet metal such as stainless steel, and the thin sheet stainless steel may be bent to define both the skin 30 and the flanges 28. The skin 30 and flanges 28 may be formed by any other suitable technique, such as direct metal printing or other additive process.

A plurality of the tiles 26 are placed in the vacuum-brazing oven with at least one apex 14 of each triangle 16 immediately adjacent to at least one apex 14 of another of the triangles 16 and with the flanges 28 of the adjoining triangles 16 in intimate contact. The flanges 28 of the adjoining tiles 26 are brazed together to define the completed structure 24, which may be an isogrid structure 6.

Two brazed-together flanges 28 of adjoining tiles 26 define the ribs 10 at each location on the completed structure 24. The adjoining flanges 28 for each tile 26 may be reinforced at each apex 14, as by providing a fold of the flange 28 at the apex 14 for brazing to the adjoining flange 28 of the same tile 26 or of an adjacent tile 26.

As shown by FIGS. 5 and 6, the completed structure 24 may be composed of individual tiles 26 where all or a portion of a rib 10 is defined by a flange 28 of only one tile 26. The result is that the amount of material, both brazing filler and flange 28, in the completed structure 24 is substantially reduced. Many different tile 26 configurations will achieve this result. The following are examples and are not a comprehensive list. In the example of triangular tiles 26, one half of the tiles 26 may include two flanges 28 that extend the length of two side 32 while the other half of the tiles 26 define a single flange 28 that extends the length of one side 32. The one- and two-flange 28 tiles 26 in combination will define the ribs 10 of the completed structure 24. For the case of rectangular tiles 26, each tile may include two flanges 28 that define two sides 32 of the tile 28. The pair of flanges 28 in combination with the flanges 28 of other rectangular tiles 26 will define the ribs 10 of the completed structure 24. For the case of hexagonal tiles 26, each tile 26 may include three flanges 28 that will define the ribs 10 of the completed structure 24.

Tiles that 26 are symmetric and interchangeable may be most useful, particularly for the manufacture of flat or symmetrical completed structures 24. Two examples are provided by FIGS. 5 and 6. In FIG. 5, each triangular tile 26 features three partial flanges 28, each of which extends from an apex 14 of the triangular tile 26 along a side 32 of the triangle 16 by somewhat more than half of the length of the side 32. FIG. 6 provides a triangular tile 26 with a flange 28 that extends the full length of one side 32 and a partial flange 28 that extends somewhat more than half the length of a second side 32.

Extending the partial flanges 28 of FIGS. 5 and 6 more than half of the length of the side 32 provides that partial flanges 28 of adjoining tiles 32 will overlap when the tiles 26 are assembled, allowing the partial flanges 28 of adjoining tiles 26 to be brazed together during the vacuum brazing step. A designer may select the strength of the resulting ribs 10 by selecting the degree of overlap of the flanges 28 defining the ribs 10.

As noted, individual tiles 26 may have any number of sides 32, provides that the tiles 26 will fit together. The sides 32 of the tiles 26 are not necessarily regular, and likely will not be regular where the completed structure will feature compound curves. Tiles 26 having irregular shape may be required at the edges of the completed structure 24 to conform the completed structure 24 to a particular application.

Figure 4:
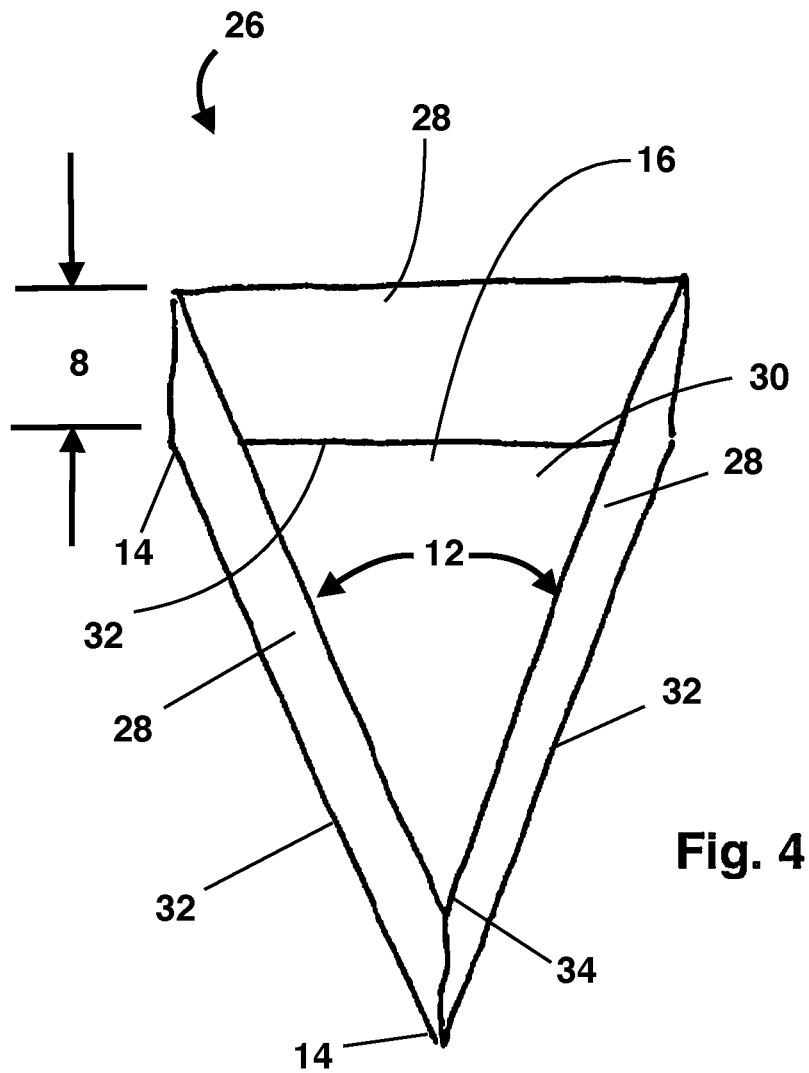
FIG. 4 is a perspective view of the underside of an individual tile having flanges and a skin.
Figure 7:
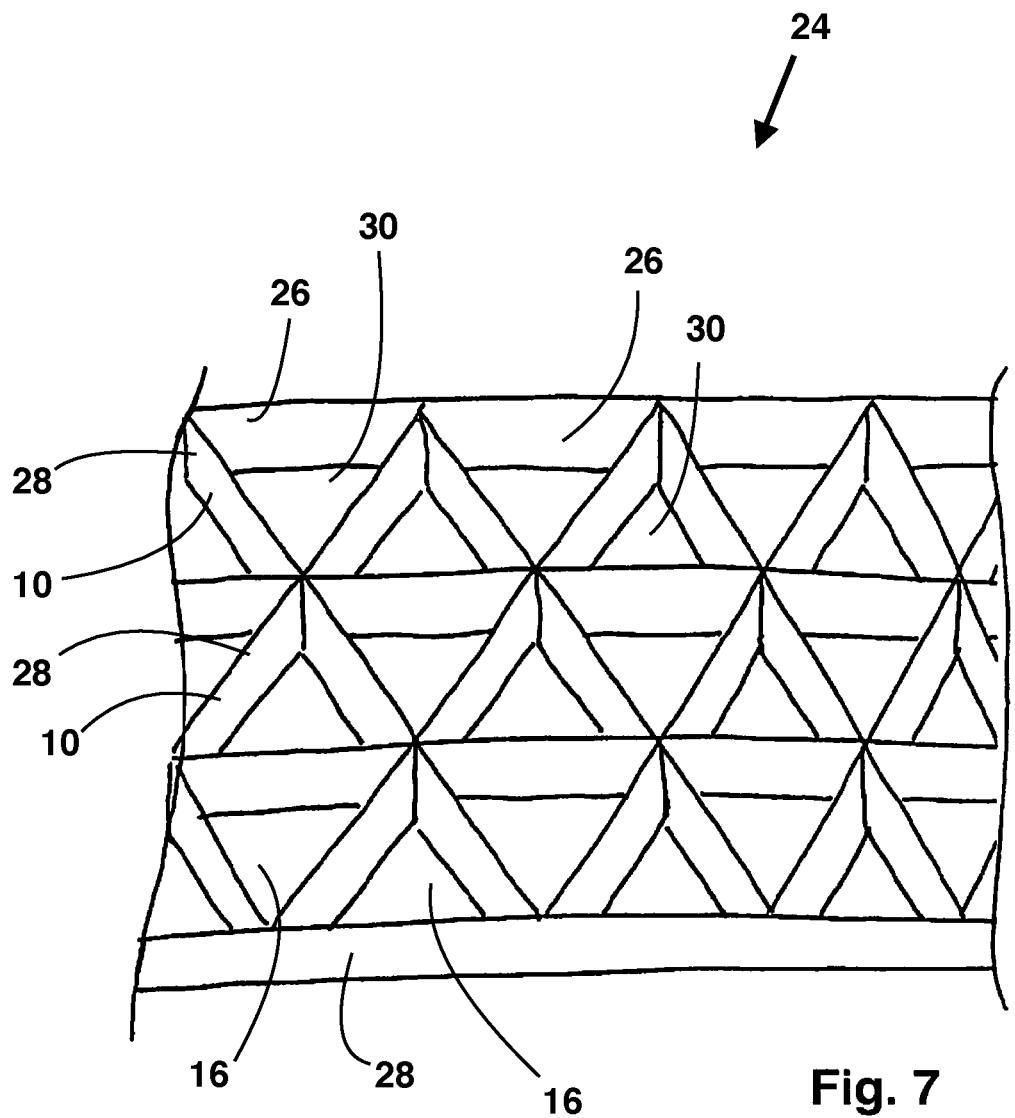
FIG. 7 is a perspective view of the underside of a completed structure composed of individual tiles.

FIG. 7 shows a completed metallic structure 24 composed of individual tiles 26 of FIG. 4, 5 or 6, or other equivalent tiles 26.

Figures 8, 9:
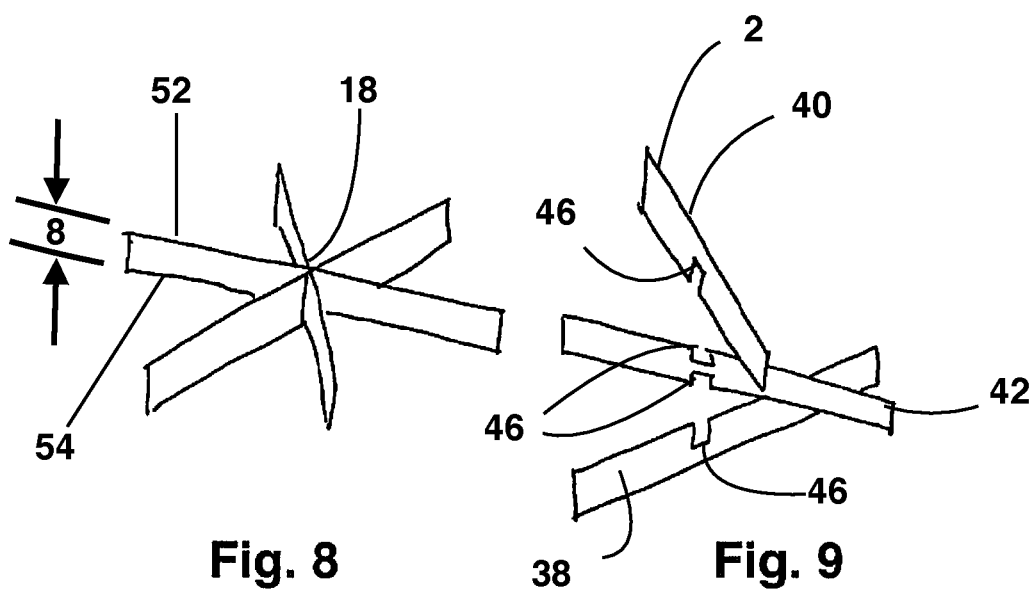
FIG. 8 is a perspective view of first, second and third metal strips intersecting to define a node.
FIG. 9 is an exploded view of the three strips of FIG. 8.
Figure 10:
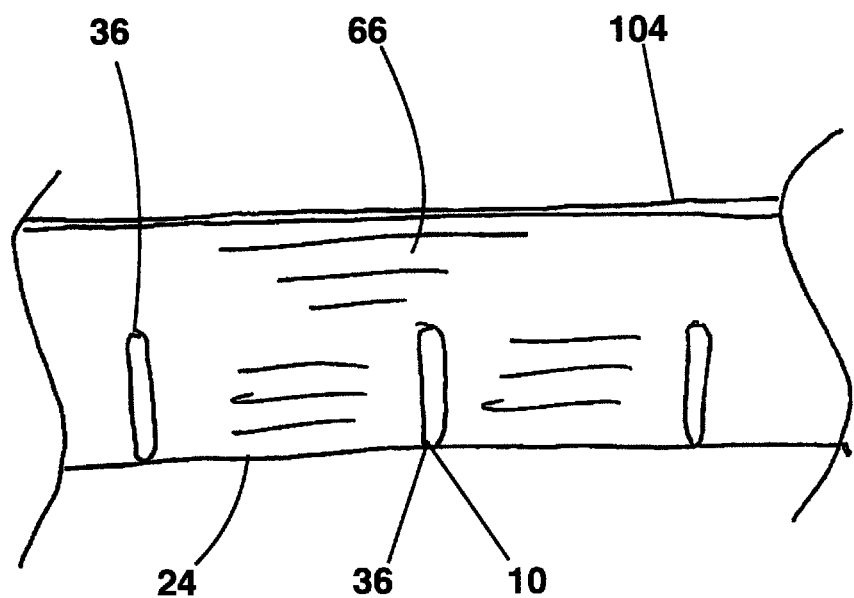
FIG. 10 illustrates an embodiment having projectile resistance that does not incorporate individual tiles.

As shown by FIGS. 8-10, the ribs 10 may define a rib lattice 36 that is separate from the individual tiles 26 and is joined to the individual tiles 26 in the vacuum brazing step. For example, elongated strips 2 of a metal, such as stainless steel sheet, may define the ribs 10. The width 8 and thickness of each strip 2 is small compared to its length. Each strip 2 has a top edge 52 and a bottom edge 54. Three configurations of strips 2 define the ribs 10 of a rib lattice 36.

First configuration strips 38 feature a notch 46 defined by the top edge 52 of the strip 2 at the location of each node 18. Second configuration strips 40 feature a notch 46 defined by the bottom edge 54 of the strip 2 at the location of each node 18. Third configuration strips 42 have a 'dog-bone' shape having notches 46 at both the top edge 52 and bottom edge 54 at the location of each node 18. The notches 46 of the first, second and third configuration strips 38, 40, 42 mesh, so that all three strips 38, 40, 42 can intersect at the same node 18. A plurality of first, second and third configuration strips 38, 40, 42 define the rib lattice 38 and intersect at each node 18 of the lattice 38.

Figure 11:
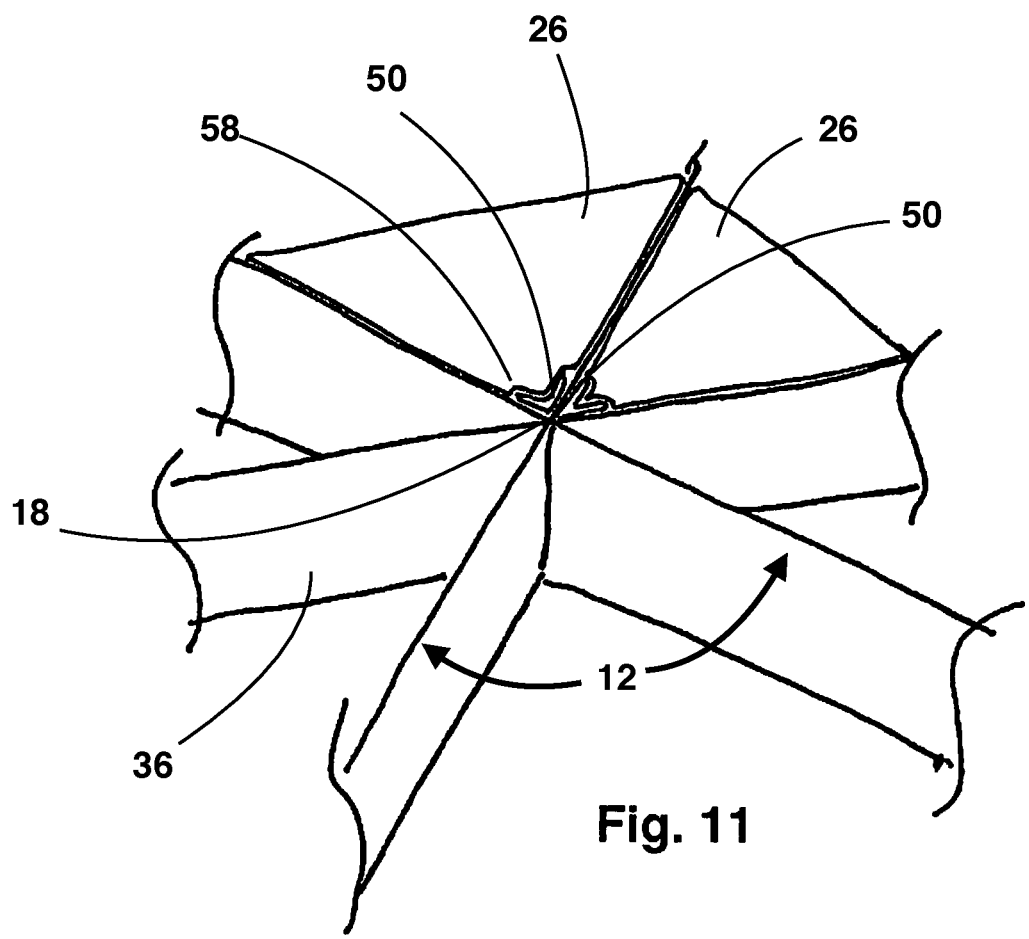
FIG. 11 is a perspective view of a rib lattice with individual tiles and corner reinforcements installed.
Figure 12:
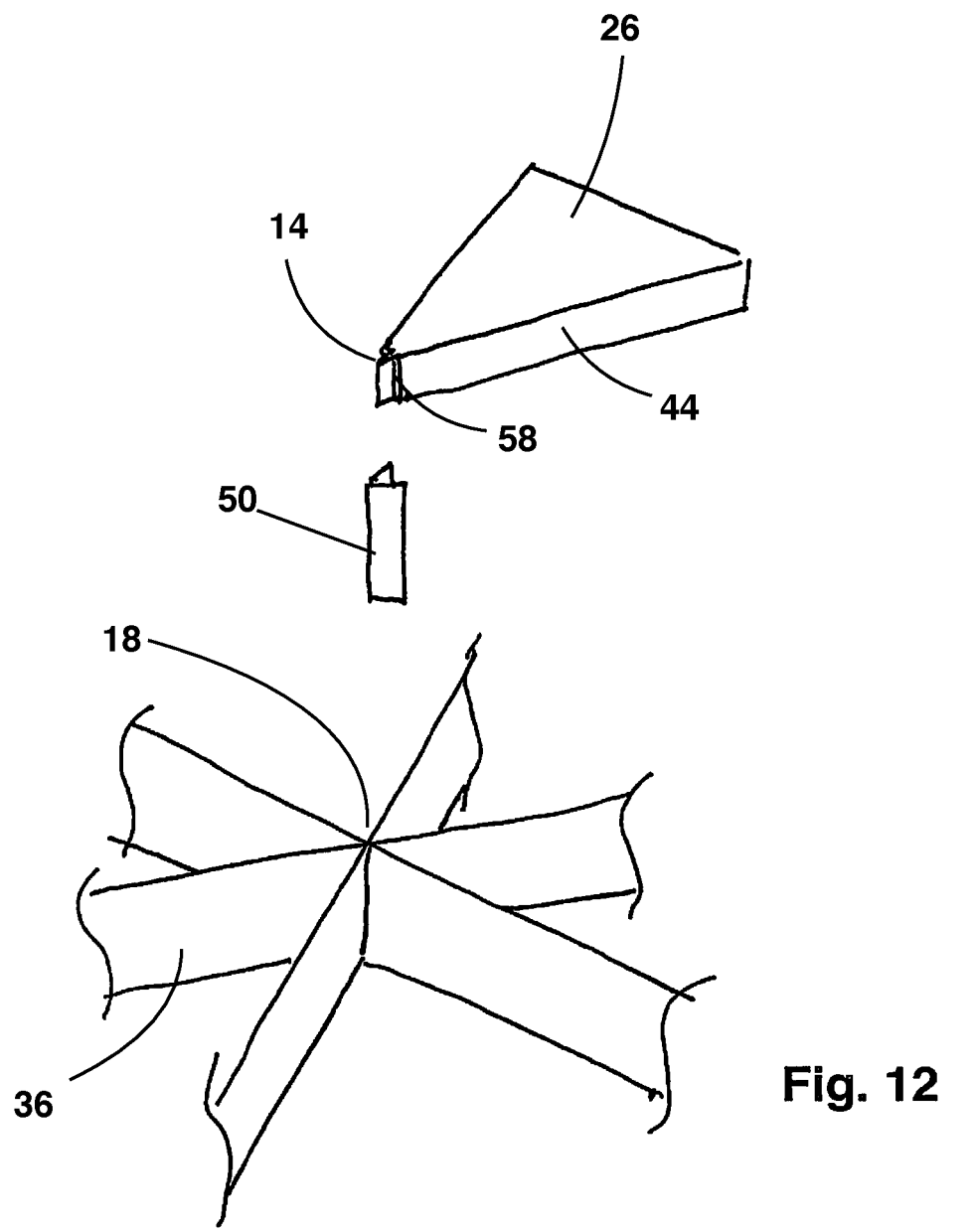
FIG. 12 is an exploded view of a rib lattice with a tile and a corner reinforcement.

As shown by FIGS. 11 and 12, individual tiles 26 occupy the spaces between the ribs 10 defined by the lattice 38 and define the surface 56 of the completed structure 24. The individual tiles 26 may be constructed similar to the individual tiles 26 discussed above, except that the flanges 28 defining each side 32 of each tile 26 define brazing flanges 28 and do not define the ribs 10. The brazing flanges 28 of each tile 26 are deep enough to provide a brazed connection to the ribs 10 that is of adequate strength for the application.

The first, second and third configuration strips 38, 40, 42 and the tiles 26 are constructed so that the strips 2 and tiles 26 are in a close relation on a fixture 48 on the interior of the vacuum-brazing oven. The close relation provides that the brazed connection between the strips 38, 40, 42 and the brazing flanges 28 of the tiles 26 will be strong and without gaps or other defects.

Any number of strips 2 may be used to construct the rib lattice 36, depending upon the shape of the tiles 26 and the shape of the completed structure 24. For example, for four-sided tiles 26, strips of only the first and second configurations 38, 40 are required, because the apexes 14 of only four tiles 26 will meet at each node 18. Each intersecting pair of adjacent strips 2 defines an interior angle 12 between the strips 2 at the node 18.

FIGS. 11 and 12 illustrate a corner reinforcement 50 to strengthen a node 18. FIG. 11 is a detail perspective view showing two tiles 26 with corner reinforcements 50 installed in a rib lattice 36. FIG. 12 is an exploded view of rib lattice 36 with a tile 26 and corner reinforcement 50. From FIGS. 9 and 10, the notches 46 in the strips 38, 40, 42 defining the ribs 10 of the rib lattice 36 create a discontinuity in each strip 38, 40, 42 and hence a weakness in the rib lattice 36 at each node 18. From FIGS. 11 and 12, each node 18 may be reinforced by a corner reinforcement 50 disposed on the interior angle 12 defined by the intersecting strips 38, 40, 42. For a structure using triangular tiles 26, a node 18 may include three strips 38, 40, 42 that define six interior angles 12. Corner reinforcements 50 may be disposed at any or all of the six interior angles 12. The corner reinforcement 50 may define a corner reinforcement angle equal to interior angle 12 to be reinforced, may be composed of metal, and may have a length corresponding to the depth 8 of the ribs 10 at the node. When the completed structure 24 is vacuum brazed together, the corner reinforcement 50 is brazed to the strips 2 and to the tile 26 and spans the notches 46 of adjoining strips 38, 40, 42, reinforcing the rib lattice 36 at the node 18.

From FIGS. 10 and 11, a tile 26 may include a relief 58 at an apex 14. The relief 58 at the apex 14 allows the corner reinforcement 50 to be placed at each apex 14 of each tile 26 when the strips 38, 40, 42 and tiles 26 are assembled in the vacuum oven for brazing. During the vacuum brazing process, the corner reinforcement 50 is brazed to the intersecting strips 38, 40, 42 at the node 18 and also is brazed to the tile 26 and its brazing flanges 44 at the node 18.

Figure 13:
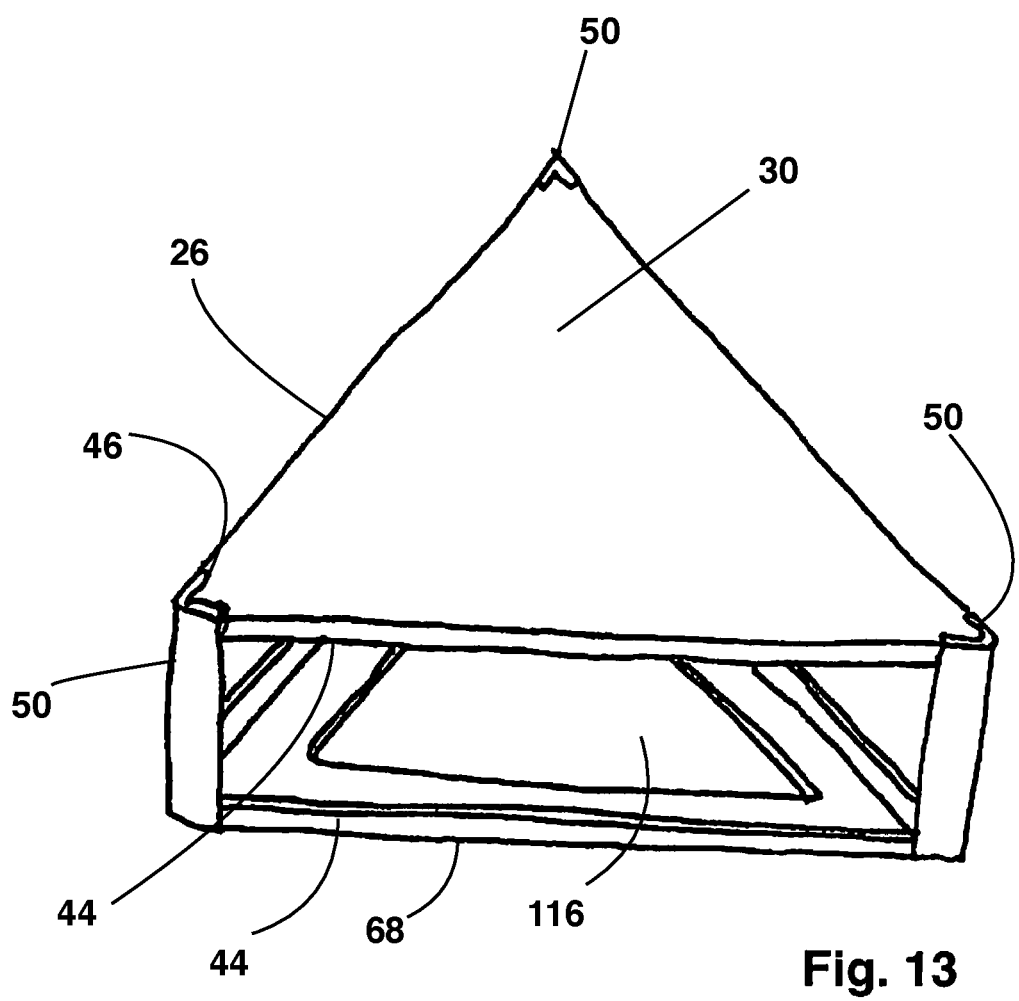
FIG. 13 is a perspective view of an individual tile composed of a skin, corner reinforcements and a backing.

FIG. 13 illustrates an individual tile 26 that is composed of the skin 30, corner reinforcements 50 and a backing 68. The notch 46 defined by the skin 30 is vacuum brazed to the corner reinforcement 50. The corner reinforcements 50 are vacuum brazed to a backing 68. The tile 26 of FIG. 13 is vacuum brazed to the rib lattice 36, as shown by FIGS. 10 and 11, to define the completed structure 24. For a completed structure 24 constructed using the individual tiles 26 of FIG. 13, the corner reinforcements 50 and the brazing flanges 44 of the tile skin 30 and of the backing 68 are vacuum brazed to the rib lattice 36. The interior volume 72 of the tile 26 in the completed structure 24 is defined on the top and bottom by the tile skin 30 and backing 68 and on the sides by the corner reinforcements 50 and ribs 10 of the rib lattice 36. As shown by FIG. 13, the backing may have one or more perforations 116 to lighten the completed structure 24 and to allow access to the interior volume 72 of the tile. Not shown by FIG. 13, the tile 26 may feature two or more additional backings 116 to divide the interior volume 72 into multiple interior volumes 72 that may be liquid-tight, as for storage of a fluid.

The tile 26 of FIG. 13 can be constructed at a time and place remote from the assembly of the completed structure 24. Vacuum brazing of the skin 30, corner reinforcements 50 and backing 68 allows the relative location of those parts to be fixed during the step of vacuum brazing the tile 26 and avoid the need for complex fixturing to support the backing 68, corner reinforcements 50 and tile skin 30 during vacuum brazing of the completed structure 24.

Figure 14:
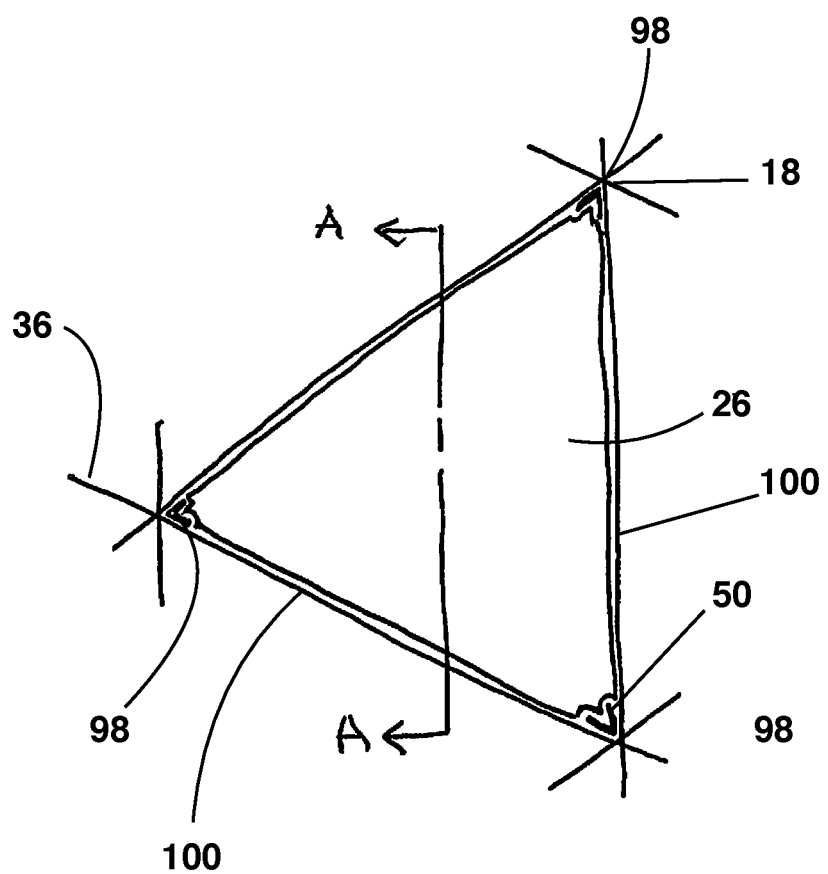
FIG. 14 is a plan view of a tile installed in a rib lattice and showing section line A-A.
Figure 15:
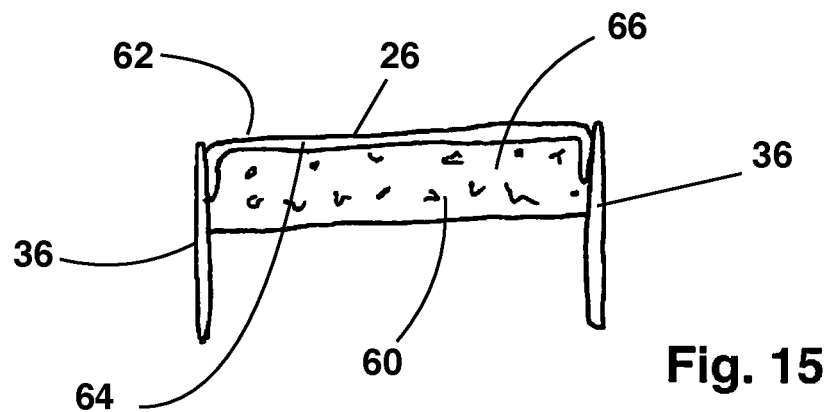
FIG. 15 is a section view showing a tile with a core.
Figure 16:
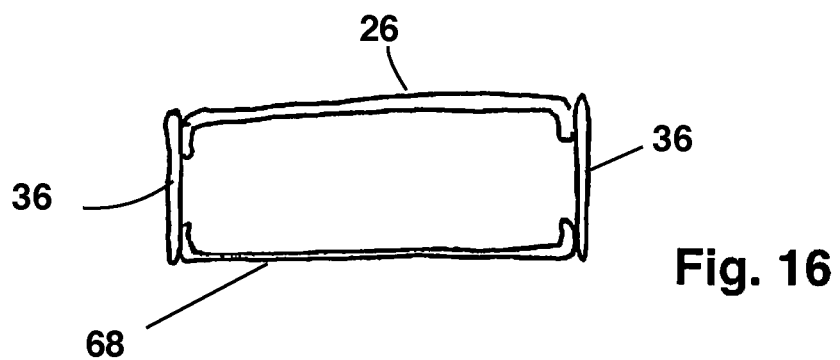
FIG. 16 is a section view showing a tile with a backing.

FIG. 14 is a detail top view of an individual tile 26 attached to a rib lattice 36. FIGS. 14 through 16 show cross section A-A of FIG. 14. As shown by FIG. 15, the tile 26 may feature a core 60. The tile 26 includes a tile skin 30 and brazing flanges 44 depending from the tile skin 30. The tile skin 30 has a top side 62 corresponding to the surface of the completed structure 24 and a bottom side 64 corresponding to the interior of the tile 26. The brazing flanges 44 depend from the tile skin 30 in a direction away from the tile skin top side 62. The core 60 is disposed on the bottom side of the tile 26 and covering all or a portion of the tile skin bottom side 64. The core 60 may increase the stiffness and strength of the tile 26 and may increase the impact resistance of the skin 30. The core 60 may be composed of any suitable material, such as a cellular metal, porous metal, metallic foam or metal sponge, all of which are referred to herein generally as 'metal foam' 66. The core 60 can be attached to the skin bottom side 64 by brazing during the vacuum brazing step; alternatively, the core 60 may be attached to the skin bottom side 64 during the manufacture of the individual tile 26 and prior to the vacuum brazing step of the completed structure 24. The core 60 may be composed of the same metal as the metal sheet defining the skin 30 and flanges 28, 44, for example stainless steel, or may be composed of a different metal than the metal composing the skin 30 or flanges 28, 44, provided that the coefficient of thermal expansion of the core 60 is adequately similar to that of the skin 30 so that the process of heating and cooling the skin 30 and core 60 during vacuum brazing does not damage the skin 30 or core 60 or leave the brazed skin 30 or core 60 with excessive residual stresses.

Figure 17:
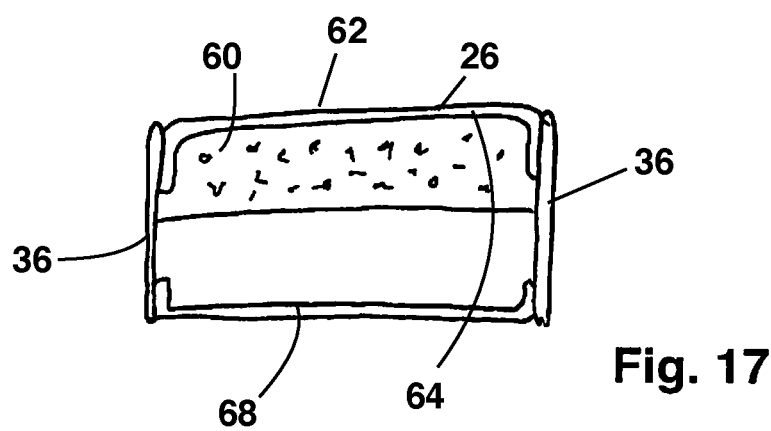
FIG. 17 is a section view showing a tile with both a core and backing.

As shown by FIG. 17, the individual tile 26 with a core 60 may include a backing 68. The backing 68 is a metal sheet covering the side of the core 60 distal to the skin bottom side 54. The backing 68 may attach the flanges 28, 44 of the tile 26 one to another. The backing 68 may be composed of a metal sheet and may be composed of the same metal as the skin 30. The backing 68 may be brazed to the core 60 and to the flanges 28, 44 during the vacuum brazing step when the completed structure 24 is assembled. Alternatively, the backing 68 may be attached to the core 60 and to the flanges 28, 44 during construction of the individual tile 26. The backing 68 may be continuous or may be perforated to allow access to the interior of the tile 26 and to reduce weight.

The backing 68 serves to reinforce the composite tile 26 composed of the skin 30, core 60 and backing 68. The composite tile 26 is stronger and stiffer than a tile 26 that that does not include the core 60 and backing 68 or that includes the core 60 without the backing 68.

A tile 26 may dispense with the core 60 and provide a skin 30, flanges 28, 44 and backing 68 with no core 60. Where strips 2 of metal define the ribs 10 of the completed structure 24, the backing 68 may be attached to the strips 2 of metal bounding the tile 26 in the completed structure 24.

Figure 18:
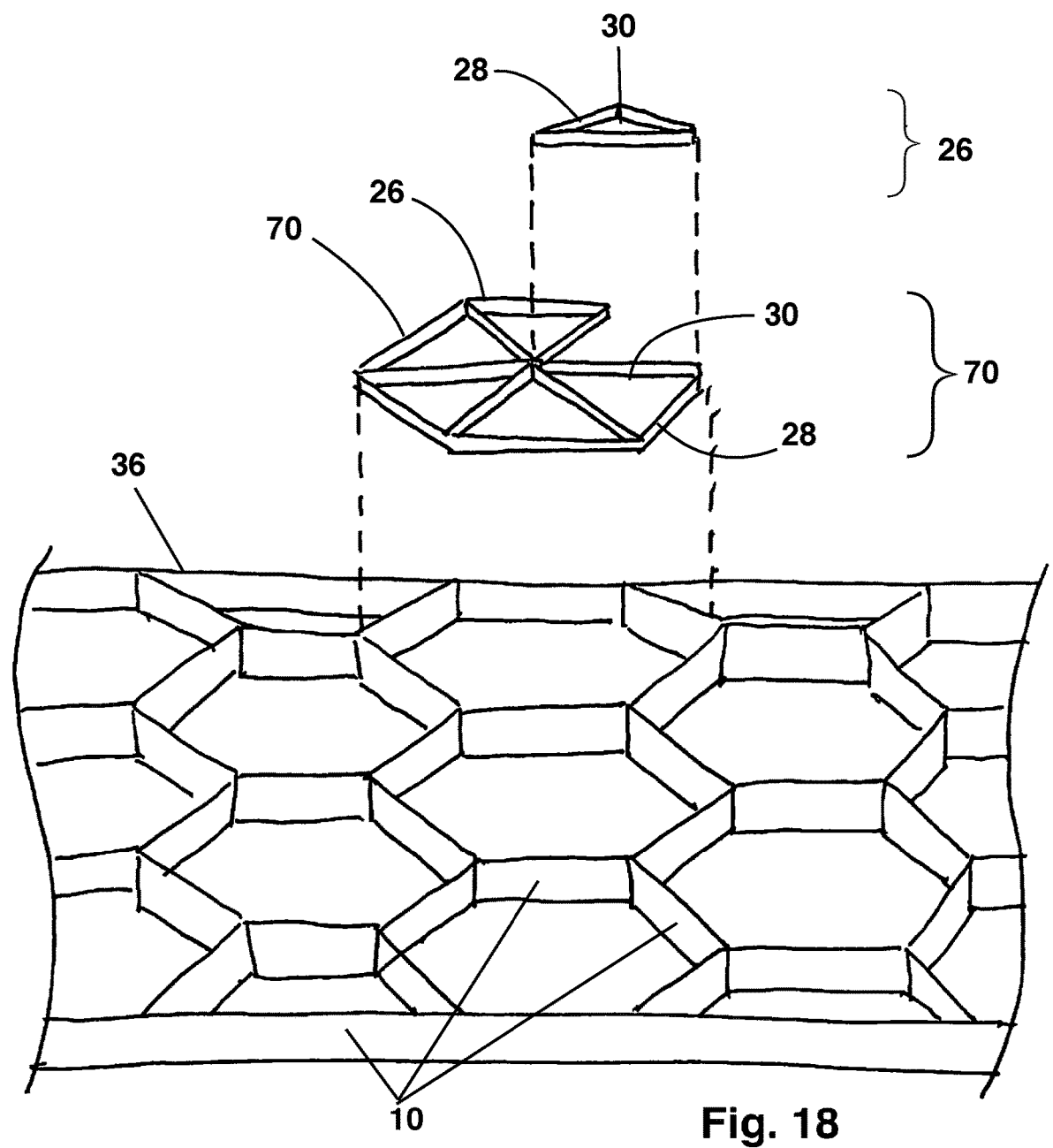
FIG. 18 is an exploded view showing a hexagonal rib lattice, a hexagonal cell, and a triangular tile comprising a part of the cell.

As shown by FIG. 18, a composite tile 70 may be a sub-assembly composed of a plurality of individual cells 69 using any of the configurations described in this document. A plurality of composite tiles 70 may then be assembled into the completed structure 24. In the example of FIG. 18, six individual cells 69 that are triangular in shape and that have flanges 28 on each side 32 may be assembled into a hexagonal composite tile 70 by vacuum brazing the flanges 28 of adjacent tiles 26 one to another. The skins 30 of the cells define the skin of the tile 70. In the example of FIG. 18, the completed tile is attached to the ribs 10 of a hexagonal rib lattice 36.

Alternatively, the perimeter flanges 28 of the composite tile 70 then may be vacuum brazed to the perimeter flanges 28 of other composite tiles 70 to define the completed structure 24. The vacuum brazed perimeter flanges 28 of the composite tile 70 define the ribs 10 of the completed structure 24.

The individual cells 69 or the composite tiles 70 may feature a core 60 or a core 60 and a backing 68 attached to the cell skin bottom side 64 of the individual cells 69 or to the back side of the skin 4 of the tile 70.

Figure 19:
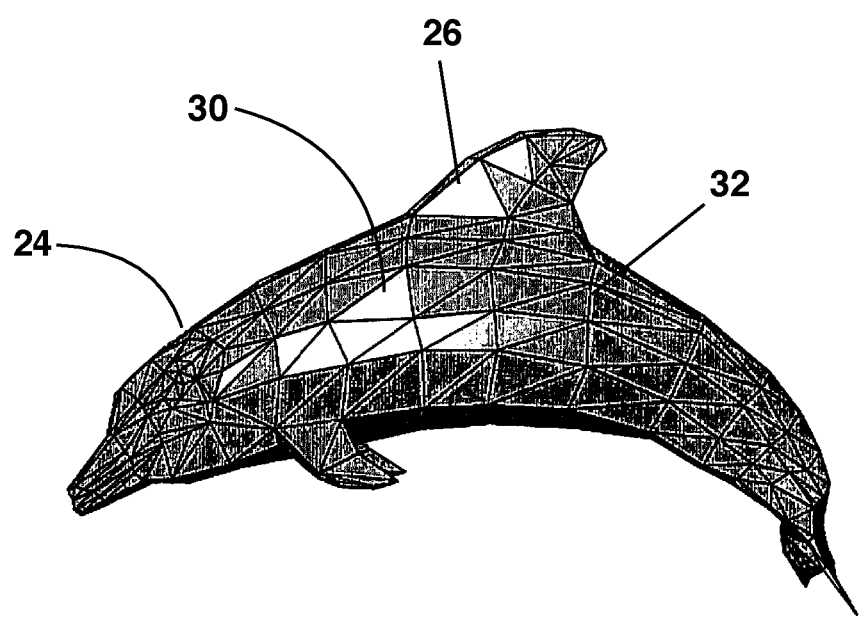
FIG. 19 is a perspective view of a completed structure having compound curves and surfaces with a changing radius of curvature.

As illustrated by FIG. 19, tiles 26 or the tiles 26 combined with a rib lattice 36 may be used to construct a completed structure 24 having flat, curved or compound curved surfaces. The configuration of the sides 32 and the flanges 28 of the combination of tiles 26 determine the surface configuration of the completed structure 24.

As shown by FIG. 19, for a completed metallic structure 24 that incorporates compound curves and curves having a radius of curvature that is increasing or decreasing, the skins 30 of the tiles 26 will define irregular triangles and the length of the sides 32 of the skins 30 will not be the same, in the same way that triangles defining a complex surface using triangle mesh modeling may be irregular and may define sides of different lengths. Providing tiles 26 that are irregular or that are or different sizes may allow the completed structure 24 to itself have an irregular shape; for example, for the construction of a storage tank to fit into a location that is irregularly shaped.

Figure 20:
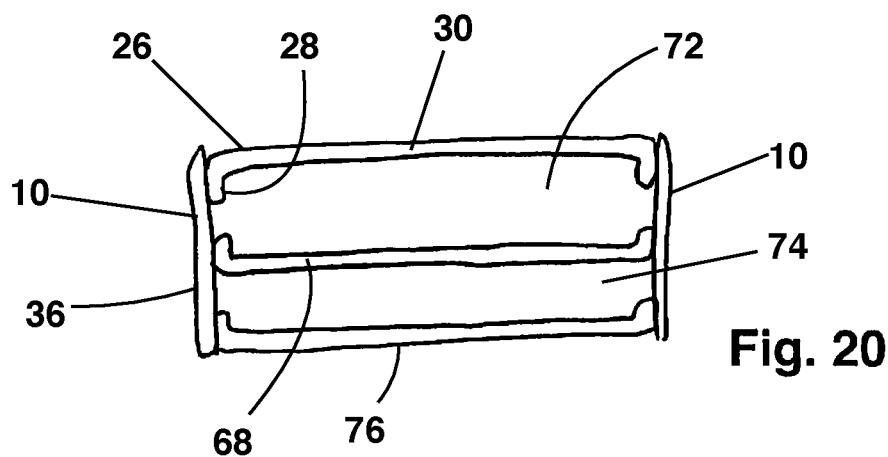
FIG. 20 is a sealed tile having two interior volumes and two backings.

FIGS. 20 and 21 are cross sections of tiles 26 along section line A-A of FIG. 14. In the example of FIG. 20, the tile 26 has a backing 68 and an additional backing 76. The tile 26 defines a first interior volume 72 and a second interior volume 74. One or both of the first and second interior volumes 72, 74 may be sealed to be fluid-tight. The tile 26 may include two or more additional backings 76 to define additional interior volumes 74 that may be fluid-tight.

FIG. 21 illustrates a tile 26 that is sealed during the brazing process so that the tile 26 defines an interior volume 72 that is fluid-tight. In this instance, the term 'fluid-tight' refers to an interior volume 72 that is adequately sealed to prevent the movement between the inside and the outside of the interior volume 72 of either liquid, gas, or both liquid and gas. The interior volume 72 may be defined by the backing 68 and the skin 30 or between the backing 68, flanges 28 and skin 30. Where a rib lattice 36 composed of strips 2 of metal supports an individual tile 26, the skin 30 and backing 68, combined with the ribs 10 surrounding the tile 26, may define the interior volume 72 of the tile 26.

As shown by FIG. 21, a tile 26 that has a sealed interior volume 72 allows the interior volume to store a fluid 78 that is a liquid or a gas, for example, where the completed structure 24 is the airframe of an aircraft, the interior volumes 72 of the tiles 26 incorporated into that structure 24 may store liquid fuel or compressed gas for the aircraft. Where the interior volumes 72 of a plurality of tiles 26 communicate one with another, as through a port 80, the plurality of tiles 26 together may store more of the fluid 78 than the interior volume 72 of a single tile 26. As illustrated by FIG. 21, the fluid 78 may be supplied for use or may be replenished through a duct 82.

As shown by FIGS. 22 and 23, tiles 26 having sealed interior volumes 72 may be used to construct a completed structure 24 that utilizes the positive pressure within the sealed interior volumes 72 as a structural element to reinforce the metallic structure 24. From FIG. 23, for a completed structure 24 having a circular cross section and with tiles 26 that are sealed and with a pressure in the interior volumes 72 of the tiles 26 that is greater than the pressure of the surrounding environment, the net of the force outward 84 due to the pressure in the interior volume 72 will be greater than the force inward 86 resulting from the pressure in the interior volume 72. The net hoop stress acting on the completed structure tends to support the completed structure in its circular shape. The result is that the completed structure may be constructed of lighter materials than would otherwise be the case.

Stated more generally, whenever the completed structure 24 defines a curve that has an inside and an outside and the fluid-tight interior volumes 72 of the tiles 26 are pressurized to a pressure greater than the ambient pressure outside the tile 26, the force acting on structure 24 toward the outside of the curve is greater than the force acting on the structure 24 toward the inside of the curve.

FIG. 22 illustrates a first example. In the example of FIG. 22, the completed structure 24 defines the hull of a submersible vehicle. The net hoop forces generated by the pressurized interior volumes 72 of the tiles 26 serve to counteract the force of water tending to crush the submersible vehicle. A second example is a roof of a building where the completed structure 24 defines a partial sphere or partial cylinder constructed as described above and with pressurized sealed tiles 26.

FIGS. 24 through 26 illustrate inspection and monitoring of the completed structure 24. FIGS. 24 and 25 are cross sections A-A from FIG. 14. FIGS. 24 and 25 illustrate use of a Belleville spring 88 to monitor whether a sealed tile 26 has leaked. In the example of FIGS. 24 and 25, the sealed interior volume 72 of the tile 26 was sealed during the brazing process and contains very little air at a first pressure. If the tile 26 develops a leak, air will flow into the interior volume 72 of the tile 26, increasing the air pressure within the tile 26 to a higher second pressure. The Belleville spring has a first position, shown by FIG. 24, corresponding to a sealed, intact tile 26 at the first pressure. FIG. 25 shows a tile that has leaked. The air pressure inside the tile 26 of FIG. 25 has increased to the second pressure, popping the Belleville spring to its second position as shown by FIG. 25. Leakage of a tile 26 can be detected by a manual observation of the Belleville springs 88.

For tiles 26 that are sealed at a second pressure higher than that of the surrounding fluid, the Belleville spring 88 is reversed, so that the Belleville spring 88 pops inward in the event of a drop in pressure in the tile 26 from the high first pressure to a lower second pressure. Again, leakage of a the tile 26 can be detected by observing the position of the Belleville spring. For FIGS. 24-26, the tiles may dispense with the Belleville spring 88 and movement of the skin 30 or backing 68 can be observed to detect a leak from or to the tile 26.

FIGS. 26 and 27 illustrate using acoustical resonance to determine whether a defect exists within a completed structure 24. Because the completed structures 24 are stiff, the structure 24 will resonate at a first resonant frequency that is generally very high, and may be ultrasonic. From the flow chart of FIG. 27, the completed structure 24 will exhibit resonances that are below the expected very high resonance if a defect in the brazed joints of the completed structure 24 exists. An inspector can detect defects in the completed structure 24 by acoustically exciting the structure 24 at a high frequency and listening for lower-than-expected resonance, which may be in the audible range. If lower-frequency resonances are detected, then a defect exists within the structure 24. The inspector can determine the location of the defect from the location of the audible resonance. The process of exciting the structure 24 and listening for resonance can be performed by automatic equipment rather than by a human inspector.

As shown by FIG. 26, the low-frequency resonance associated with a defect can be augmented and made easier to detect by including an acoustical resonator 90 into the structure of one or more tiles 26. The acoustical resonator can be a reed, fork, or other object configured to resonate when the completed structure 24 is resonating at a second, lower, resonant frequency associated with a defect. The acoustic resonator 90 can be configured to resonate in the audible range.

Also as shown by FIG. 26, the performance of a sealed tile 26 may be monitored by directly measuring the fluid pressure within the tile 26 using a gauge 92 or apparatus configured to detect a change in pressure.

FIGS. 28 and 29 illustrate the use of gradient metallurgy to locally adjust the metallurgical characteristics of the relatively thin metal sheet from which the ribs 10, tiles 26 and backing 68 are composed. FIG. 28 is a detail cross section of a brazed joint between the brazing flanges 44 of adjacent tiles 26 and the intervening rib 10. FIG. 29 is a magnified view of the brazed joint during the vacuum brazing process.

In the example of FIGS. 28 and 29, the ribs 10 and tiles, including the tile skins 30 and brazing flanges 44, are composed of relatively thin stainless steel sheet. The stainless steel is cleaned of chromium oxide and plated 94 to prevent the chromium oxide from re-forming. In the example of FIGS. 28 and 29, the plating 94 is of nickel. As shown by FIG. 29, the surfaces that will be brazed are coated with brazing filler 96. In this example, the brazing filler 96 also contains nickel.

From FIG. 29, when the assembly is heated in the vacuum-brazing oven, the nickel in the plating 94 and the brazing filler 96 melts and diffuses into the surface of the stainless steel brazing flanges 44 and web 10, and any other stainless components that are being vacuum brazed, such as the corner reinforcements 50. The higher the temperature, the faster the nickel diffuses into the stainless steel. The longer the elevated temperature is maintained, the farther into the stainless steel the nickel will penetrate. For brazing of relatively thin stainless steel sheet, the nickel can diffuse entirely through the stainless steel sheet. When the completed structure is cooled, the nickel remains in the stainless steel, affecting its metallurgical properties.

FIG. 30 is a method of locally adjusting the stiffness of stainless steel sheet during the vacuum brazing process. The purpose of the method is to reduce stress risers in the stainless steel of the completed structure 24 caused by disparities in stiffness between adjoining locations within the stainless steel. The first step in the method is performed during the design phase of the completed structure—the designer identifies first locations 98 within the stainless steel that will be stiffer than adjoining second locations 100 within the stainless steel in the absence of changes to the stiffness of the first and second locations 98, 100. As shown by FIG. 14, an example first location that will be stiff compared to adjoining second locations is a node 18; namely, the location at which ribs 10 intersect. An example of second locations that will be not-as-stiff is a rib 10 located between nodes 10. Other first and second locations 98, 100 at which stress risers are likely to occur include locations at which the thickness of material changes abruptly, such as near the termination of a corner reinforcement 50.

The next two steps in the method of FIG. 30 are to apply nickel-containing plating 94, nickel-containing brazing filler 96, or both, to the adjoining first and second locations 98, 100 identified as stiff and as not-as-stiff. More nickel is applied by plating or by coating with brazing filler to the stiff first locations 98 than to the less-stiff second locations 100. The difference in the amount of nickel applied corresponds to the desired change in relative stiffness at those locations 98, 100.

The final step of the method is to vacuum braze the assembled components to create the completed structure 24. The brazing temperatures, duration and temperature profile are selected so that the desired relatively-large amount of nickel will diffuse by the desired amount into the stiff first locations 98 and that the desired lesser amount of nickel will diffuse by the desired amount into the less-stiff second locations 100. The stiffness of the first locations 98 is reduced by more than the stiffness of the second locations 100, reducing the stiffness disparity between adjoining locations 98, 100 and reducing the formation of stress risers in the completed structure 24.

As noted above, other characteristics, such as electrical or thermal conductivity, of the metal forming the ribs 10 or the tiles 26 can be locally manipulated by diffusion of other alloying materials using the same technique.

FIG. 31 through 32 illustrate a lightweight armor 102 that may be incorporated into the completed structure 24. FIG. 32 is a detail cross section of FIG. 31. FIG. 33 is a detail cross section showing the response of the armor 102 to a projectile 112 strike. The lightweight armor 102 may have particular application to the airframe or floor of a military aircraft, such as a helicopter or compound aircraft.

In the example of FIG. 31, a completed structure 24 has ribs 10, tile skin 30 and backing 68, as described above. A layer of metal foam 66 is disposed adjacent to the tile skin 30 on the side of the completed structure 24 toward the threat. The metal foam 66 may be created during the vacuum brazing step in which the completed structure 24 is assembled. A layer of high-strength material 104 having little or no deformation in tension is disposed on the side of the metal foam 66 toward the threat. The high-strength material having little or no deformation in tension may be any such material known in the armor art and may include glass fibers, carbon fibers, aramid fibers, and ultra-high-molecular-weight polyethylene.

As shown by the detail cross section of FIG. 32, the metal foam 66 may be a composite foam layer comprising alternating layers of closed cell metal foam 106, open cell (reticulated) metal foam 108, and metal foil 110. The reticulated metal foam 108 allows the movement of air through the pores of the foam 108, and hence allows energy 114 to move through the pores of the reticulated metal foam 108. Any number of layers may be used.

FIG. 33 illustrates the armor 102 of FIG. 32 during a strike by a projectile 112. The projectile 112 first encounters the high-strength material 104. The high-strength material does not deform in tension. Because the high-strength material 104 is attached to the composite metal foam 66, the high-strength material 104 creates a generally circular, cone-shaped depression in the metal foam 66, transferring some of the kinetic energy of the projectile 112 laterally to the metal foam 66 surrounding the generally cone-shaped depression.

Also from FIG. 33, the force of the high-strength material 104 pressing against the closed-cell metal foam 106 both elastically and plastically deforms the closed-cell meal foam 106 within the area of the cone-shaped depression, changing a portion of the kinetic energy of the impact into heat. The closed chambers of the closed-cell metal foam 106 act to some extent as air springs and to have some resilience to rebound from the deformation of the foam 106 caused by a projectile 112 strike, spreading the transfer of kinetic energy of the strike over time and reducing damage from the projectile 112 strike.

The high-strength material 104 and displaced closed cell metal foam 106 compress the underlying reticulated metal foam 108, compressing the air and creating a shock wave within the reticulated foam 108 and projecting the energy 114 of the compressed air and shock wave, laterally away from the location of the impact. The metal foil 110 underlying the reticulated metal foam 108 prevents movement of the air and shockwave into the underlying closed-cell foam 106. The combination of the reticulated metal foam 108 and foil 110 converts more of the kinetic energy of the impact to heat.

The responses described above for the closed cell foam 106, open cell foam 108 and foil 110 are repeated for each of the alternating layers in the composite metal foam 66, all to prevent a damaging amount of energy from the projectile strike to reach the ribs 10 and skin 30 of the completed structure 24.

FIGS. 34 and 35 illustrate the use of tabs 20 and slots 22 for attachment or fixturing. The use of tabs 20 and slots 22 allows the components of the completed structure 24 to be self-fixturing; that is, the tabs 20 and slots 22 hold the components in a close relationship and in a correct orientation and position during vacuum brazing or other joining operations. Alternatively, the tabs 20 and slots 22 may be used to attach the components one to another without brazing or other attachment. The tabs 20 and slots 22 may be used for any of the embodiments described above.

In FIGS. 34 and 35, the tabs 20 and slots 22 are used to attach a skin 4 to a rib 10. The tab 20 is inserted through the slot 22 in the skin 4. As shown by FIG. 35, the tab 20 is plastically deformed by twisting the tab by about 90 degrees so that the long dimension of the tab 20 is normal to the slot 22. The tab 20 is equipped with wings 118 that may be defined by the opposite ends of the tab 20. The wings 118 are attached to the top of the tab 20, but the bottom of the wing 118 is not attached to the tab 20. The wings 118 define flat springs. Twisting the tab by 90 degrees shortens the tab 20, moving the wings 118 closer to the skin 4. The wings 118 engage the skin 4 and plastically deform. The wings apply a force to the skin 4 determined by the spring rate of the wings 118 and by the deformation of the wings 118. The force pulls the skin 4 and the rib 10 together.

FIG. 36 shows that an outer skin 4 may be supported by a structure comprising a rib matrix 36, individual tiles 26 and a core 60. Supporting the outer skin 4 by the core 60 allows the completed structure 24 to exhibit a surface that does not display the joints between the tile skins 30 and ribs 10.

FIG. 10 illustrates an armor 102 embodiment that has projectile resistance. FIG. 10 is similar to FIG. 31, but does not incorporate individual tiles 26. The high strength material 104 is backed by metal foam 106, 108 and supported by a rib lattice 36. The armor 102 may function as described above relating to FIG. 32, and may feature alternating layers of closed cell metal foam 106, open cell (reticulated) metal foam 108, and metal foil 110.

LIST OF NUMBERED ELEMENTS 2 metallic strips
4 stainless steel skin
6 isogrid structure
8 width
10 rib
12 angle
14 apex
16 triangle
18 node
20 tabs
22 slots
24 metallic structure
26 tile
28 flange
30 skin
32 side
34 fold
36 rib lattice
38 first configuration
40 second configuration
42 third configuration
44 brazing flange
46 notch
48 fixture
50 corner reinforcement
52 top edge
54 bottom edge
56 surface
58 relief
60 core
62 tile skin top side
64 tile skin bottom side
66 metal foam
68 backing
69 cell
70 composite tile
72 Interior volume
74 second interior volume
76 second backing
78 fluid
80 port
82 duct
84 force outward
86 force inward 88 Belleville spring
90 acoustical resonator
92 pressure gauge
94 plating
96 brazing filler
98 first location
100 second location
102 armor
104 high-strength material
106 closed cell metal foam
108 open-cell (reticulated) metal foam
110 foil
112 projectile
114 energy diverted in reticulated foam
116 perforation
118 wing

What is claimed is:

1. A method of constructing a metallic structure, the method comprising the steps of:
 a. providing a rib lattice having intersecting ribs;
 b. providing a plurality of tiles, each of said tiles having a flange about a perimeter of said tile, said tiles and said rib lattice being configured for said tiles to engage said rib lattice in a space between said ribs;
 c. placing said flanges of each of said tiles between adjacent ribs of said rib lattice and in engagement with said ribs;
 d. vacuum brazing said flanges of each of said tiles to said ribs wherein at least one of said tiles has a skin and two or more backings, said skin and said two or more backings being disposed between said flanges in a spaced-apart relation, said step of providing each of said plurality of tiles further comprising: vacuum brazing said two or more backings between said flanges so that said tile defines two or more interior volumes, said two or more interior volumes are not occupied by said skin, said two or more backings or said flanges.

2. A method of constructing a metallic structure, the method comprising the steps of:
 a. providing a rib lattice having intersecting ribs;
 b. providing a plurality of tiles, each of said tiles having a flange about a perimeter of said tile, said tiles and said rib lattice being configured for said tiles to engage said rib lattice in a space between said ribs;
 c. placing said flanges of each of said tiles between adjacent ribs of said rib lattice and in engagement with said ribs;
 d. vacuum brazing said flanges of each of said tiles to said ribs wherein a one of said plurality of tiles is a composite tile, said step of providing said plurality of tiles-comprises:
 a. providing a plurality of cells, each of said cells having a skin, a perimeter, and a flange disposed about said perimeter;
 b. placing said flange of each of said plurality of cells in engagement with at least one other of said plurality of cells;
 c. vacuum brazing said plurality of cells one to another to define said composite tile.

3. A method of constructing a metallic structure, the method comprising the steps of:
 a. providing a rib lattice having intersecting ribs;
 b. providing a plurality of tiles, each of said tiles having a flange about a perimeter of said tile, said tiles and said rib lattice being configured for said tiles to engage said rib lattice in a space between said ribs;
 c. placing said flanges of each of said tiles between adjacent ribs of said rib lattice and in engagement with said ribs;
 d. vacuum brazing said flanges of each of said tiles to said ribs, the metallic structure has a first acoustical resonance frequency after said brazing step when the metallic structure is constructed without a defect, said step of providing said plurality of tiles further comprises:
 e. providing an acoustical resonator configured to resonate at a second frequency lower than said first acoustical resonance frequency;
 f. attaching said acoustical resonator within one or more of said plurality of tiles during said vacuum brazing step;
 g. after said vacuum brazing step, acoustically exciting the metallic structure;
 h. listening for resonance of said acoustical resonator at said second frequency, whereby resonance of said acoustical resonator at said second frequency reveals said defect.

4. A method of constructing a metallic structure, the method comprising the steps of:
 a. providing two or more metallic components;
 b. placing the two or more metallic components in engagement;
 c. joining the two or more metallic components together by vacuum brazing, the vacuum brazing step further comprising:
  i. identifying a first location within the metallic structure at which a stiffness of the metallic structure after said vacuum brazing step is projected to be greater than said stiffness at a second location, said second location adjoining said first location;
  ii. applying nickel plating or nickel-containing brazing filler to said first and said second locations, a thickness of said nickel plating or said nickel filler being selected to be greater at said first location than at said second location;
  iii. heating said metallic components under reduced air pressure, whereby an increased amount of nickel diffuses into said metallic components at said first location than at said second location, causing a difference in stiffness between said first location and said second location of the metallic structure to be less than it otherwise would be and reducing stress risers proximal to said first location due to said difference in stiffness.

5. The method of claim 4 wherein the step of proving two or more metallic components comprises:
 a. providing a rib lattice having intersecting ribs;
 b. providing a plurality of tiles, each of said tiles having a flange about a perimeter of said tile, said tiles and said ribs being configured for said tiles to engage said rib lattice in a space between said ribs.

6. The method of claim 5 wherein the step of placing said two or more metallic components in engagement comprising: placing said flange of each of said tiles between adjacent ribs of said rib lattice and in engagement with said ribs.

7. The method of claim 4 wherein said two or more metallic components are composed of a stainless steel.

8. The method of claim 6, said method of providing said rib lattice comprising: providing elongated metallic strips having a width and a thickness, said thickness being small compared to said width, said elongated metallic strips defining notches configured to cooperate so that said elongated metallic strips may be placed in intersecting engagement without interference between the elongated metallic strips to define said rib lattice.

9. The method of claim 8 wherein said rib lattice defines a node at an intersection of said ribs, each said node defining a plurality of interior angles between adjacent said ribs, said step of providing said rib lattice further comprises:
 a. providing a corner reinforcement, said corner reinforcement defining a corner reinforcement angle, said corner reinforcement angle being equal to a one of said interior angles;
 b. placing said corner reinforcement in engagement with said one of said interior angles of said adjacent ribs;
 c. vacuum brazing said corner reinforcement to said adjacent ribs in said vacuum brazing step.

10. The method of claim 4 wherein said step of providing each of said plurality of tiles comprises:
 a. providing a skin, one or more corner reinforcements and a backing;
 b. placing said skins and said backing in a spaced-apart relation and separated by said one or more corner reinforcements located at one or more corners of said skin and said backing;
 c. vacuum brazing said skin, said backing and said one or more corner reinforcements one to another to define one of said plurality of tiles.

11. The method of claim 4 wherein each of said plurality of tiles defines a skin disposed between said flanges, each of said tiles defining an interior volume, said step of providing each of said plurality of tiles further comprising:
 a. providing at least one core composed of a metal foam;
 b. placing said core in contact with said skin within said interior volume of at least one of said tiles;
 c. vacuum brazing said core to said skin within said interior volume.

* * * * *